United States Patent
VanStee et al.

(10) Patent No.: US 7,603,526 B2
(45) Date of Patent: Oct. 13, 2009

(54) SYSTEMS AND METHODS FOR PROVIDING DYNAMIC MEMORY PRE-FETCH

(75) Inventors: Dustin J. VanStee, Poughkeepsie, NY (US); Kevin C. Gower, Lagrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 268 days.

(21) Appl. No.: 11/668,088

(22) Filed: Jan. 29, 2007

(65) Prior Publication Data

US 2008/0183903 A1 Jul. 31, 2008

(51) Int. Cl.
*G06F 12/00* (2006.01)
(52) U.S. Cl. .................. 711/154; 711/137
(58) Field of Classification Search .................. None
See application file for complete search history.

(56) References Cited

U.S. PATENT DOCUMENTS

| | | | |
|---|---|---|---|
| 2,842,682 A | 7/1958 | Clapper | |
| 3,333,253 A | 7/1967 | Sahulka | |
| 3,395,400 A | 7/1968 | De Witt | |
| 3,825,904 A | 7/1974 | Burk et al. | 340/172.5 |
| 4,028,675 A | 6/1977 | Frankenberg | 711/106 |
| 4,135,240 A | 1/1979 | Ritchie | |
| 4,150,428 A | 4/1979 | Inrig et al. | |
| 4,472,780 A | 9/1984 | Chenoweth et al. | |
| 4,475,194 A | 10/1984 | LaVallee et al. | 371/10 |
| 4,486,739 A | 12/1984 | Franaszek et al. | 340/347 |
| 4,641,263 A | 2/1987 | Perlman et al. | |
| 4,654,857 A | 3/1987 | Samson et al. | |
| 4,723,120 A | 2/1988 | Petty, Jr. | 340/825.02 |
| 4,740,916 A | 4/1988 | Martin | 364/900 |
| 4,796,231 A | 1/1989 | Pinkham | 365/189.05 |
| 4,803,485 A | 2/1989 | Rypinski | 370/452 |
| 4,833,605 A | 5/1989 | Terada et al. | 364/200 |
| 4,839,534 A | 6/1989 | Clasen | 307/269 |
| 4,943,984 A | 7/1990 | Pechanek et al. | 375/109 |
| 4,985,828 A | 1/1991 | Shimizu et al. | 364/200 |
| 5,053,947 A | 10/1991 | Heibel et al. | 364/200 |

(Continued)

FOREIGN PATENT DOCUMENTS

EP 0229316 A2 7/1987

(Continued)

OTHER PUBLICATIONS

PCT International Search Report PCT/EP2006/068984. Mailed Feb. 16, 2007.

(Continued)

*Primary Examiner*—Jack A Lane
(74) *Attorney, Agent, or Firm*—Cantor Colburn LLP

(57) ABSTRACT

Systems and methods for providing dynamic memory pre-fetch. Embodiments include a hub device including an input command stream interface and an adaptive pre-fetch logical unit (APLU). The input command stream interface detects commands from a memory controller directed to one or more memory devices that are connected to the hub device. The APLU independently analyzes the commands to determine access patterns to the memory devices. The APLU also dynamically selects between enabling a pre-fetch function and disabling the pre-fetch function for the memory devices based on the results of the analysis.

20 Claims, 9 Drawing Sheets

U.S. PATENT DOCUMENTS

| | | | |
|---|---|---|---|
| 5,177,375 A | 1/1993 | Ogawa et al. | |
| 5,206,946 A | 4/1993 | Brunk | 710/2 |
| 5,214,747 A | 5/1993 | Cok | 395/27 |
| 5,265,049 A | 11/1993 | Takasugi | |
| 5,265,212 A | 11/1993 | Bruce, II | 710/113 |
| 5,287,531 A | 2/1994 | Rogers, Jr. et al. | 395/800 |
| 5,347,270 A | 9/1994 | Matsuda et al. | 340/2.21 |
| 5,357,621 A | 10/1994 | Cox | |
| 5,375,127 A | 12/1994 | Leak | |
| 5,387,911 A | 2/1995 | Gleichert et al. | 341/95 |
| 5,394,535 A | 2/1995 | Ohuchi | 711/155 |
| 5,454,091 A | 9/1995 | Sites et al. | 395/413 |
| 5,475,690 A | 12/1995 | Burns et al. | 370/105.3 |
| 5,513,135 A | 4/1996 | Dell et al. | |
| 5,517,626 A | 5/1996 | Archer et al. | |
| 5,522,064 A | 5/1996 | Aldereguia et al. | |
| 5,544,309 A | 8/1996 | Chang et al. | |
| 5,546,023 A | 8/1996 | Borkar et al. | |
| 5,561,826 A | 10/1996 | Davies et al. | |
| 5,592,632 A | 1/1997 | Leung et al. | 395/306 |
| 5,594,925 A | 1/1997 | Harder et al. | |
| 5,611,055 A | 3/1997 | Krishan et al. | 395/281 |
| 5,613,077 A | 3/1997 | Leung et al. | 395/306 |
| 5,627,963 A | 5/1997 | Gabillard et al. | 714/42 |
| 5,629,685 A | 5/1997 | Allen et al. | 340/825.02 |
| 5,661,677 A | 8/1997 | Rondeau, II et al. | 365/63 |
| 5,666,480 A | 9/1997 | Leung et al. | 395/180 |
| 5,684,418 A | 11/1997 | Yanagiuchi | |
| 5,706,346 A | 1/1998 | Katta et al. | |
| 5,737,589 A | 4/1998 | Doi et al. | |
| 5,754,804 A | 5/1998 | Cheselka et al. | |
| 5,764,155 A | 6/1998 | Kertesz et al. | 340/825.08 |
| 5,822,749 A | 10/1998 | Agarwal | 707/2 |
| 5,852,617 A | 12/1998 | Mote, Jr. | 714/726 |
| 5,870,320 A | 2/1999 | Volkonsky | |
| 5,870,325 A | 2/1999 | Nielsen et al. | 365/63 |
| 5,872,996 A | 2/1999 | Barth et al. | 395/853 |
| 5,881,154 A | 3/1999 | Nohara et al. | |
| 5,917,760 A | 6/1999 | Millar | |
| 5,917,780 A | 6/1999 | Millar | |
| 5,926,838 A | 7/1999 | Jeddeloh | 711/167 |
| 5,928,343 A | 7/1999 | Farmwald et al. | 710/104 |
| 5,930,273 A | 7/1999 | Mukojima | 714/776 |
| 5,959,914 A | 9/1999 | Gates et al. | |
| 5,973,951 A | 10/1999 | Bechtolsheim et al. | 365/52 |
| 5,974,493 A | 10/1999 | Okumura et al. | 710/307 |
| 5,995,405 A | 11/1999 | Trick | 365/63 |
| 6,003,121 A | 12/1999 | Wirt | |
| 6,011,732 A | 1/2000 | Harrison et al. | |
| 6,038,132 A | 3/2000 | Tokunaga et al. | 361/760 |
| 6,049,476 A | 4/2000 | Laudon et al. | 365/52 |
| 6,076,158 A | 6/2000 | Sites et al. | 712/230 |
| 6,078,515 A | 6/2000 | Nielsen et al. | 365/63 |
| 6,081,868 A | 6/2000 | Brooks | |
| 6,085,276 A | 7/2000 | VanDoren et al. | |
| 6,096,091 A | 8/2000 | Hartmann | 716/17 |
| 6,128,746 A | 10/2000 | Clark et al. | 713/324 |
| 6,145,028 A | 11/2000 | Shank et al. | |
| 6,170,047 B1 | 1/2001 | Dye | 711/170 |
| 6,170,059 B1 | 1/2001 | Pruett et al. | 713/200 |
| 6,173,382 B1 | 1/2001 | Dell et al. | |
| 6,185,718 B1 | 2/2001 | Dell et al. | |
| 6,198,304 B1 | 3/2001 | Sasaki | |
| 6,215,686 B1 | 4/2001 | Deneroff et al. | 365/52 |
| 6,219,288 B1 | 4/2001 | Braceras et al. | |
| 6,219,760 B1 | 4/2001 | McMinn | |
| 6,233,639 B1 | 5/2001 | Dell et al. | |
| 6,260,127 B1 | 7/2001 | Olarig et al. | 711/167 |
| 6,262,493 B1 | 7/2001 | Garnett | |
| 6,285,172 B1 | 9/2001 | Torbey | |
| 6,292,903 B1 | 9/2001 | Coteus et al. | 713/401 |
| 6,301,636 B1 | 10/2001 | Schultz et al. | 711/108 |
| 6,308,247 B1 | 10/2001 | Ackerman et al. | |
| 6,317,352 B1 | 11/2001 | Halbert et al. | 365/52 |
| 6,321,343 B1 | 11/2001 | Toda | 713/600 |
| 6,338,113 B1 | 1/2002 | Kubo et al. | 711/105 |
| 6,349,390 B1 | 2/2002 | Dell et al. | |
| 6,357,018 B1 | 3/2002 | Stuewe et al. | |
| 6,370,631 B1 | 4/2002 | Dye | 711/170 |
| 6,378,018 B1 | 4/2002 | Tsern et al. | 710/129 |
| 6,381,685 B2 | 4/2002 | Dell et al. | |
| 6,393,512 B1 | 5/2002 | Chen et al. | |
| 6,393,528 B1 | 5/2002 | Arimilli et al. | 711/137 |
| 6,408,398 B1 | 6/2002 | Frecker et al. | |
| 6,425,044 B1 | 7/2002 | Jeddeloh | |
| 6,446,174 B1 | 9/2002 | Dow | |
| 6,461,013 B1 | 10/2002 | Simon | |
| 6,467,013 B1 | 10/2002 | Nizar | |
| 6,473,836 B1 | 10/2002 | Ikeda | 711/137 |
| 6,477,614 B1 | 11/2002 | Leddige et al. | |
| 6,477,615 B1 | 11/2002 | Tanaka | |
| 6,483,755 B2 | 11/2002 | Leung et al. | 365/189.05 |
| 6,484,271 B1 | 11/2002 | Gray | |
| 6,487,102 B1 | 11/2002 | Halbert et al. | |
| 6,487,627 B1 | 11/2002 | Willke et al. | 710/306 |
| 6,493,250 B2 | 12/2002 | Halbert et al. | 365/63 |
| 6,496,540 B1 | 12/2002 | Widmer | 375/242 |
| 6,496,910 B1 | 12/2002 | Baentsch et al. | 711/165 |
| 6,499,070 B1 | 12/2002 | Whetsel | |
| 6,502,161 B1 | 12/2002 | Perego et al. | 711/5 |
| 6,507,888 B2 | 1/2003 | Wu et al. | 711/105 |
| 6,510,100 B2 | 1/2003 | Grundon et al. | |
| 6,513,091 B1 | 1/2003 | Blackmon et al. | 710/316 |
| 6,526,469 B1 | 2/2003 | Drehmel et al. | |
| 6,530,007 B2 | 3/2003 | Olarig et al. | |
| 6,532,525 B1 | 3/2003 | Aleksic et al. | 711/168 |
| 6,546,359 B1 | 4/2003 | Week | 702/186 |
| 6,549,971 B1 | 4/2003 | Cecchi et al. | 710/306 |
| 6,553,450 B1 | 4/2003 | Dodd et al. | 711/105 |
| 6,557,069 B1 | 4/2003 | Drehmel et al. | 710/307 |
| 6,564,329 B1 | 5/2003 | Cheung et al. | 713/322 |
| 6,584,576 B1 | 6/2003 | Co | |
| 6,587,112 B1 | 7/2003 | Leddige et al. | |
| 6,587,912 B2 | 7/2003 | Leddige | |
| 6,590,827 B2 | 7/2003 | Chang et al. | |
| 6,594,713 B1 | 7/2003 | Fuoco et al. | |
| 6,594,748 B1 | 7/2003 | Lin | |
| 6,601,121 B2 | 7/2003 | Singh et al. | 710/112 |
| 6,601,149 B1 | 7/2003 | Brock et al. | |
| 6,604,180 B2 | 8/2003 | Jeddeloh | |
| 6,611,905 B1 | 8/2003 | Grundon et al. | 711/167 |
| 6,622,217 B2 | 9/2003 | Gharacorloo et al. | 711/141 |
| 6,622,227 B2 | 9/2003 | Zumkehr et al. | |
| 6,625,687 B1 | 9/2003 | Halber et al. | 711/105 |
| 6,625,702 B2 | 9/2003 | Rentscler et al. | |
| 6,628,538 B2 | 9/2003 | Funaba et al. | 365/63 |
| 6,631,439 B2 | 10/2003 | Saulsbury et al. | |
| 6,636,957 B2 | 10/2003 | Stevens et al. | |
| 6,643,745 B1 * | 11/2003 | Palanca et al. | 711/138 |
| 6,671,376 B1 | 12/2003 | Koto et al. | 380/210 |
| 6,678,811 B2 | 1/2004 | Rentschler et al. | 711/167 |
| 6,681,292 B2 | 1/2004 | Creta et al. | |
| 6,684,320 B2 | 1/2004 | Mohamed et al. | |
| 6,697,919 B2 | 2/2004 | Gharachorloo et al. | 711/141 |
| 6,704,842 B2 | 3/2004 | Janakiraman et al. | |
| 6,721,185 B2 | 4/2004 | Dong et al. | |
| 6,721,944 B2 | 4/2004 | Chaudhry et al. | |
| 6,738,836 B1 | 5/2004 | Kessler et al. | |
| 6,741,096 B2 | 5/2004 | Moss | |
| 6,748,518 B1 | 6/2004 | Guthrie et al. | |
| 6,754,762 B1 | 6/2004 | Curley | |
| 6,766,389 B2 | 7/2004 | Hayter et al. | |
| 6,775,747 B2 | 8/2004 | Venkatraman | |
| 6,791,555 B1 | 9/2004 | Radke et al. | |

| | | | | | |
|---|---|---|---|---|---|
| 6,792,495 B1 | 9/2004 | Garney et al. | 2002/0103988 A1 | 8/2002 | Dornier ................ 712/38 |
| 6,799,241 B2 | 9/2004 | Kahn et al. | 2002/0112119 A1 | 8/2002 | Halbert et al. ............ 711/115 |
| 6,807,650 B2 | 10/2004 | Lamb et al. | 2002/0112194 A1 | 8/2002 | Uzelac ................ 713/500 |
| 6,839,393 B1 | 1/2005 | Sidiropoulos ............ 375/371 | 2002/0124195 A1 | 9/2002 | Nizar ................ 713/320 |
| 6,847,583 B2 | 1/2005 | Janzen et al. | 2002/0124201 A1 | 9/2002 | Edwards et al. |
| 6,851,036 B1 | 2/2005 | Toda et al. | 2002/0147898 A1 | 10/2002 | Rentschler et al. .......... 711/170 |
| 6,874,102 B2 | 3/2005 | Doody et al. | 2002/0174274 A1 | 11/2002 | Wu et al. ................ 710/100 |
| 6,877,076 B1 | 4/2005 | Cho et al. | 2003/0009632 A1 | 1/2003 | Arimilli et al. |
| 6,877,078 B2 | 4/2005 | Fujiwara et al. | 2003/0028701 A1 | 2/2003 | Rao et al. |
| 6,882,082 B2 | 4/2005 | Greeff et al. | 2003/0033364 A1 | 2/2003 | Garnett et al. ............ 709/203 |
| 6,889,284 B1 | 5/2005 | Nizar et al. | 2003/0051055 A1 | 3/2003 | Parrella et al. |
| 6,898,726 B1 | 5/2005 | Lee | 2003/0056183 A1 | 3/2003 | Kobayashi |
| 6,910,146 B2 | 6/2005 | Dow | 2003/0084309 A1 | 5/2003 | Kohn ................ 713/189 |
| 6,918,068 B2 | 7/2005 | Vail et al. | 2003/0090879 A1 | 5/2003 | Doblar et al. |
| 6,925,534 B2 | 8/2005 | David | 2003/0105938 A1 | 6/2003 | Cooksey et al. |
| 6,938,119 B2 | 8/2005 | Kohn et al. | 2003/0118044 A1 | 6/2003 | Blanc et al. |
| 6,944,084 B2 | 9/2005 | Wilcox | 2003/0126354 A1 | 7/2003 | Kahn et al. |
| 6,948,091 B2 | 9/2005 | Bartels et al. | 2003/0126363 A1 | 7/2003 | David |
| 6,949,950 B2 | 9/2005 | Takahashi et al. | 2003/0223303 A1 | 12/2003 | Lamb et al. ............ 365/230.06 |
| 6,952,761 B2 | 10/2005 | John | 2003/0229770 A1* | 12/2003 | Jeddeloh ................ 711/213 |
| 6,965,952 B2 | 11/2005 | Echartea et al. | 2003/0235222 A1 | 12/2003 | Bridges et al. |
| 6,977,536 B2 | 12/2005 | Chin-Chieh et al. ........ 327/116 | 2003/0236959 A1 | 12/2003 | Johnson et al. ............ 711/167 |
| 6,977,979 B1 | 12/2005 | Hartwell et al. | 2004/0006674 A1 | 1/2004 | Hargis et al. ................ 711/156 |
| 6,993,612 B2 | 1/2006 | Porterfield | 2004/0015650 A1 | 1/2004 | Zumkehr et al. |
| 6,996,639 B2* | 2/2006 | Narad ................ 710/52 | 2004/0049723 A1 | 3/2004 | Obara ................ 714/729 |
| 7,039,755 B1 | 5/2006 | Helms | 2004/0078615 A1 | 4/2004 | Martin et al. |
| 7,047,370 B1 | 5/2006 | Jeter, Jr. et al. | 2004/0098546 A1 | 5/2004 | Bashant et al. |
| 7,047,371 B2 | 5/2006 | Dortu | 2004/0098549 A1 | 5/2004 | Dorst |
| 7,047,373 B2 | 5/2006 | Kim | 2004/0117588 A1 | 6/2004 | Arimilli et al. ............ 711/203 |
| 7,047,384 B2 | 5/2006 | Bodas et al. | 2004/0123222 A1 | 6/2004 | Widmer |
| 7,051,172 B2 | 5/2006 | Mastronarde et al. | 2004/0128474 A1 | 7/2004 | Vorbach ................ 712/10 |
| 7,076,700 B2 | 7/2006 | Rieger | 2004/0148482 A1 | 7/2004 | Grundy et al. |
| 7,091,890 B1 | 8/2006 | Sasaki et al. | 2004/0160832 A1 | 8/2004 | Janzen et al. |
| 7,103,792 B2 | 9/2006 | Moon | 2004/0163028 A1 | 8/2004 | Olarig |
| 7,120,743 B2 | 10/2006 | Meyer et al. | 2004/0165609 A1 | 8/2004 | Herbst et al. |
| 7,133,790 B2 | 11/2006 | Liou | 2004/0199363 A1 | 10/2004 | Bohizic et al. |
| 7,133,972 B2* | 11/2006 | Jeddeloh ................ 711/137 | 2004/0205433 A1 | 10/2004 | Gower et al. |
| 7,155,016 B1 | 12/2006 | Betts et al. | 2004/0230718 A1 | 11/2004 | Polzin et al. |
| 7,162,567 B2* | 1/2007 | Jeddeloh ................ 711/5 | 2004/0246767 A1 | 12/2004 | Vogt ................ 365/154 |
| 7,177,211 B2 | 2/2007 | Zimmerman | 2004/0250153 A1 | 12/2004 | Vogt ................ 713/500 |
| 7,194,593 B2 | 3/2007 | Schnepper | 2004/0260909 A1* | 12/2004 | Lee et al. ................ 711/213 |
| 7,197,594 B2 | 3/2007 | Raz et al. | 2004/0260957 A1 | 12/2004 | Jeddeloh et al. |
| 7,203,318 B2 | 4/2007 | Collum et al. | 2005/0023560 A1 | 2/2005 | Ahn et al. ................ 257/200 |
| 7,206,887 B2 | 4/2007 | Jeddeloh | 2005/0027941 A1 | 2/2005 | Wang et al. |
| 7,206,962 B2 | 4/2007 | Deegan | 2005/0044305 A1 | 2/2005 | Jakobs et al. |
| 7,210,059 B2 | 4/2007 | Jeddeloh | 2005/0050237 A1 | 3/2005 | Jeddeloh et al. ................ 710/10 |
| 7,216,196 B2 | 5/2007 | Jeddeloh | 2005/0050255 A1 | 3/2005 | Jeddeloh ................ 710/317 |
| 7,216,276 B1 | 5/2007 | Azimi et al. | 2005/0066136 A1 | 3/2005 | Schnepper ................ 711/154 |
| 7,222,213 B2 | 5/2007 | James | 2005/0071542 A1* | 3/2005 | Weber et al. ................ 711/105 |
| 7,227,949 B2 | 6/2007 | Heegard et al. | 2005/0071707 A1 | 3/2005 | Hampel |
| 7,240,145 B2 | 7/2007 | Holman | 2005/0078506 A1 | 4/2005 | Rao et al. |
| 7,260,685 B2 | 8/2007 | Lee et al. | 2005/0080581 A1 | 4/2005 | Zimmerman et al. ........ 702/117 |
| 7,266,634 B2 | 9/2007 | Ware et al. | 2005/0081129 A1 | 4/2005 | Shah et al. |
| 7,296,129 B2 | 11/2007 | Gower et al. | 2005/0086424 A1 | 4/2005 | Oh et al. |
| 7,313,583 B2 | 12/2007 | Porten et al. | 2005/0086441 A1 | 4/2005 | Myer et al. |
| 7,319,340 B2 | 1/2008 | Jeddeloh et al. | 2005/0097249 A1 | 5/2005 | Oberlin et al. |
| 7,321,979 B2 | 1/2008 | Lee | 2005/0105350 A1 | 5/2005 | Zimmerman |
| 7,353,316 B2 | 4/2008 | Erdmann | 2005/0120157 A1 | 6/2005 | Chen et al. ................ 710/313 |
| 7,363,419 B2 | 4/2008 | Cronin et al. | 2005/0125702 A1 | 6/2005 | Huang et al. |
| 7,363,436 B1 | 4/2008 | Yeh et al. | 2005/0125703 A1 | 6/2005 | Lefurgy et al. |
| 7,370,134 B2 | 5/2008 | Jeddeloh | 2005/0138246 A1 | 6/2005 | Chen et al. |
| 7,376,146 B2 | 5/2008 | Beverly et al. | 2005/0138267 A1 | 6/2005 | Bains et al. |
| 7,386,575 B2 | 6/2008 | Bashant et al. | 2005/0144399 A1 | 6/2005 | Hosomi ................ 711/145 |
| 7,418,526 B2 | 8/2008 | Jeddeloh | 2005/0149665 A1 | 7/2005 | Wolrich et al. |
| 7,421,525 B2 | 9/2008 | Polzin et al. | 2005/0166006 A1 | 7/2005 | Talbot et al. |
| 7,433,258 B2 | 10/2008 | Rao et al. | 2005/0177677 A1 | 8/2005 | Jeddeloh |
| 2001/0000822 A1 | 5/2001 | Dell et al. ................ 711/170 | 2005/0177690 A1 | 8/2005 | LaBerge ................ 711/154 |
| 2001/0003839 A1 | 6/2001 | Kondo ................ 711/144 | 2005/0204216 A1 | 9/2005 | Daily et al. ................ 714/724 |
| 2001/0029566 A1 | 10/2001 | Woo | 2005/0216678 A1 | 9/2005 | Jeddeloh |
| 2002/0019926 A1 | 2/2002 | Huppenthal et al. ........ 712/15 | 2005/0220097 A1 | 10/2005 | Swami et al. |
| 2002/0038405 A1 | 3/2002 | Leddige et al. ............ 711/115 | 2005/0223196 A1 | 10/2005 | Knowles |
| 2002/0059439 A1 | 5/2002 | Arroyo et al. | 2005/0229132 A1 | 10/2005 | Butt et al. ................ 716/10 |
| 2002/0083255 A1 | 6/2002 | Greeff et al. ................ 710/305 | 2005/0248997 A1 | 11/2005 | Lee |

| | | | |
|---|---|---|---|
| 2005/0257005 | A1 | 11/2005 | Jeddeloh |
| 2005/0259496 | A1 | 11/2005 | Hsu et al. .................. 365/226 |
| 2005/0289292 | A1 | 12/2005 | Morrow et al. |
| 2005/0289377 | A1 | 12/2005 | Luong et al. |
| 2006/0004953 | A1 | 1/2006 | Vogt |
| 2006/0036826 | A1 | 2/2006 | Dell et al. |
| 2006/0036827 | A1 | 2/2006 | Dell et al. |
| 2006/0080584 | A1 | 4/2006 | Hartnett et al. |
| 2006/0085602 | A1 | 4/2006 | Huggahalli et al. |
| 2006/0095592 | A1 | 5/2006 | Borkenhagen |
| 2006/0095679 | A1 | 5/2006 | Edirisooriya |
| 2006/0104371 | A1 | 5/2006 | Schuermans et al. |
| 2006/0107175 | A1 | 5/2006 | Dell et al. |
| 2006/0112238 | A1 | 5/2006 | Jamil et al. |
| 2006/0161733 | A1 | 7/2006 | Beckett et al. |
| 2006/0162882 | A1 | 7/2006 | Ohara et al. |
| 2006/0168407 | A1 | 7/2006 | Stern |
| 2006/0179208 | A1 | 8/2006 | Jeddeloh |
| 2006/0190674 | A1 | 8/2006 | Poechmueller |
| 2006/0195631 | A1 | 8/2006 | Rajamani |
| 2006/0206742 | A1 | 9/2006 | James |
| 2006/0212666 | A1* | 9/2006 | Jeddeloh .................. 711/154 |
| 2006/0224764 | A1 | 10/2006 | Shinohara et al. |
| 2006/0277365 | A1 | 12/2006 | Pong |
| 2006/0288172 | A1 | 12/2006 | Lee et al. |
| 2007/0005922 | A1 | 1/2007 | Swaminathan et al. |
| 2007/0025304 | A1 | 2/2007 | Leelahakriengkrai et al. |
| 2007/0038907 | A1 | 2/2007 | Jeddeloh et al. |
| 2007/0067382 | A1 | 3/2007 | Sun |
| 2007/0083701 | A1 | 4/2007 | Kapil |
| 2007/0160053 | A1 | 7/2007 | Coteus et al. |
| 2008/0043808 | A1 | 2/2008 | Hsu et al. |
| 2008/0162807 | A1 | 7/2008 | Rothman et al. |
| 2008/0222379 | A1 | 9/2008 | Jeddeloh |

FOREIGN PATENT DOCUMENTS

| | | |
|---|---|---|
| EP | 0470734 A1 | 2/1992 |
| EP | 0899743 A2 | 6/1998 |
| EP | 1429340 A2 | 7/2003 |
| EP | 1429340 A2 | 6/2004 |
| GB | 2396711 A | 6/2004 |
| JP | 59153353 A | 9/1984 |
| JP | 0114140 A | 6/1989 |
| JP | 0432614 | 11/1992 |
| JP | 10011971 | 1/1998 |
| JP | 2004139552 A | 5/2004 |
| JP | 2008003711 A | 1/2008 |
| WO | 9621188 | 7/1996 |
| WO | 9812651 | 3/1998 |
| WO | 0004881 A2 | 1/2000 |
| WO | 0223353 A2 | 3/2002 |
| WO | WO2005038660 | 4/2005 |
| WO | 2007109888 | 10/2007 |

OTHER PUBLICATIONS

PCT International Search Report PCT/EP2007/057916. Mailed Dec. 14, 2007.
IEEE, "IEEE Standard Test Access Port and Boundary-Scan Architecture", Jul. 23, 2001, IEEE Std 1149-1-2001, pp. 11-13.
Rosenberg, "Dictionary of Computers, Information Processing & Telecommunications", Second Edition, John Wiley & Sons, Inc. 1987. 3 pgs.
U.S. Appl. No. 11/419,586, filed May 22, 2006. Robert B. Tremaine. "Systems and Methods for Providing Remote Pre-Fetch Buffers".
PCT Search Report. PCT/EP2007/057915. Mailed Nov. 7, 2007.
International Search Report, International Application No. PCT/EP2007/054929, International Publication No. WO 2007/135144 A1, received Mar. 21, 2008.
International Search Report, International Patent Application No. PCT/US07/75944, mailed Sep. 23, 2008, 3 pages.
European Search Report, European Patent Application No. 05106701.5, mailed Oct. 7, 2008, 5 pages.
European Search Report, European Patent Application No. 05109837.4, mailed Oct. 7, 2008, 5 pages.
Wikipedia, Serial Communications, [online], [retrieved Apr. 10, 2007 from the Internet], http://en.wikipedia.org/wiki/Serial_communications, 3 pages.
Joe Jeddeloh, Fully Buffered DIMM (FB-DIMM), XP002490174, Advanced Systems Technology, Micron Technology, Inc. Apr. 16, 2008, 32 pages.
Timothy J. Dell, "The RAS Implications of DIMM Connector Failure Rates in Large, Highly Available Server Systems", The 53rd IEEE Holm Conference on Electrical Contacts, IEEE, Sep. 16-19, 2007, pp. 256-261.
"Using Dual and Mappable Spare Bus", XP000433763, IBM Technical Disclosure Bulletin, vol. 37, No. 2B, IBM Copr., NY, US, Feb. 1, 1994, pp. 59-63.
"Novel Bus Reconfiguration Scheme With Spare Lines", XP000676205, IBM Technical Disclosure Bulletin, vol. 29, No. 12, IBM Copr., NY, US, May 12, 1987, pp. 5590-5593.
European Search Report, European Patent Application 05106700.7, received Aug. 11, 2008.
Yang, Q.; Bhuyan, L.N., "Analysis of packet-switched multiple-bus multiprocessor systems," Computers, IEEE Transactions on, vol. 40, No. 3, pp. 352-357, Mar. 1991.
Li, P.; Martinez, J.; Tang, J.; Priore, S.,; Hubbard, K.; Jie Xue; Poh, E.; Ong MeiLin; Chok KengYin; Hallmark, C.; Mendez, D.; "Development and evaluation of a high performance fine pitch SODIMM socket package." Electronic Components and Technology Conference, 2004. Proceedings. 54th, vol. 1, pp. 1161-1166, Jun. 1-4, 2004.
Nilsen, "High-Level Dynamic Memory Management for Object-Oriented Real-Time Systems", Jan. 1, 1996, pp. 86-93.
Wang, et al., "Guided Region Prefetching: A Cooperative Hardware/Software Approach", Jun. 2003, pp. 388-398.
Natarajan, et al., "A Study of Performance Impact of Memory Controller Features in Multi-Processor Server Environment", WMPI, Jun. 2004, pp. 80-87.
Luca Benini, et al., "System-Level Powers Optimization: Techniques and Tools", ACM Transactions on Design Automation of Electronic Systems, vol. 5, No. 2, Apr. 2000, pp. 115-192.
Boudon, et al., "Novel Bus Reconfiguration Scheme With Spare Lines", IBM Technical Disclosure Bulletin, May 1987, vol. 29, No. 12, pp. 1-3.
Brown, et al "Compiler-Based I/O Prefetching for Out-of-Core Applications", ACM Transactions on Computer Systems, vol. 19, No. 2, May 2001, pp. 111-170.
Ghoneima et al.; "Optimum Positioning of Interleaved Repeaters in Bidirectional Buses;" IEEE Transactions on Computer-Aided Design of Integrated Circuits and Systems, vol. 25, No. 3, Mar. 2005, pp. 461-469.
JEDEC Solid State Technoloy Association, "JEDEC Standard: DDR2 SDRAM Specification", Jan. 2004, JEDEC, Revision JESD79-2A, p. 10.
Jungjoon Kim et al.; "Performance and Architecture Features of Segmented Multiple Bus System;" IEEE Computer Society; 1999 International Conference on Parallel Processing (ICPP '99).
Massoud Pedram, "Power Minimization in IC Design Principles and Applications", ACM Transactions on Design Automation of Electronic Systems vol. 1, No. 1, Jan. 1996, pp. 3-56.
P.R. Panda, "Data and Memory Optimization Techniques For Embedded Systems", ACM Transactions on Design Automation of Electronic Systems, vol. 6, No. 2, Apr. 2001, pp. 149-206.
Penrod, Lee, "Understanding System Memory and CPU Speeds: A laymans guide to the Front Side Bus (FSB)", Dec. 28, 2005, Direction . Org, pp. 1-5, http://www.directron.com/directron/fsbguide.html. [online]; [retrieved on Feb. 23, 2006]; retrieved from the Internet.

Seceleanu et al.; "Segment Arbiter as Action System;" IEEE 2003 pp. 249-252.

Singh, S., et al., "Bus Sparing for Fault-Tolerant System Design", IBM Technical Disclosure Bulletin, Dec. 1991, vol. 34, No. 71, pp. 117-118.

Sivencrona et al.; "RedCAN™: Simulations of two Fault Recovery Algorithms for CAN;" Proceedings for the 10th IEEE Pacific Rim International Symposium on Dependable Computing (PRDC'04); 2005.

* cited by examiner

SYSTEMS AND METHODS FOR PROVIDING DYNAMIC MEMORY PRE-FETCH

BACKGROUND OF THE INVENTION

This invention relates generally to computer memory, and more particularly to providing dynamic memory pre-fetch.

Contemporary high performance computing main memory systems are generally composed of one or more dynamic random access memory (DRAM) devices, which are connected to one or more processors via one or more memory control elements. Overall computer system performance is affected by each of the key elements of the computer structure, including the performance/structure of the processor(s), any memory cache(s), the input/output (I/O) subsystem(s), the efficiency of the memory control function(s), the main memory device(s), and the type and structure of the memory interconnect interface(s).

Extensive research and development efforts are invested by the industry, on an ongoing basis, to create improved and/or innovative solutions to maximizing overall system performance and density by improving the memory system/subsystem design and/or structure. High-availability systems present further challenges as related to overall system reliability due to customer expectations that new computer systems will markedly surpass existing systems in regard to mean-time-between-failure (MTBF), in addition to offering additional functions, increased performance, increased storage, lower operating costs, etc. Other frequent customer requirements further exacerbate the memory system design challenges, and include such items as ease of upgrade and reduced system environmental impact (such as space, power and cooling).

FIG. 1 relates to U.S. Pat. No. 5,513,135 to Dell et al., of common assignment herewith, and depicts an early synchronous memory module. The memory module depicted in FIG. 1 is a dual in-line memory module (DIMM). This module is composed of synchronous DRAMs 8, buffer devices 12, an optimized pinout, and an interconnect and capacitive decoupling method to facilitate high performance operation. The patent also describes the use of clock re-drive on the module, using such devices as phase-locked loops (PLLs).

FIG. 2 relates to U.S. Pat. No. 6,173,382 to Dell et al., of common assignment herewith, and depicts a computer system 10 which includes a synchronous memory module 220 that is directly (i.e. point-to-point) connected to a memory controller 14 via a bus 240, and which further includes logic circuitry 24 (such as an application specific integrated circuit, or "ASIC") that buffers, registers or otherwise acts on the address, data and control information that is received from the memory controller 14. The memory module 220 can be programmed to operate in a plurality of selectable or programmable modes by way of an independent bus, such as an inter-integrated circuit (I2C) control bus 34, either as part of the memory initialization process or during normal operation. When utilized in applications requiring more than a single memory module connected directly to a memory controller, the patent notes that the resulting stubs can be minimized through the use of field-effect transistor (FET) switches to electrically disconnect modules from the bus.

Relative to U.S. Pat. No. 5,513,135, U.S. Pat. No. 6,173,382 further demonstrates the capability of integrating all of the defined functions (address, command, data, presence detect, etc) into a single device. The integration of functions is a common industry practice that is enabled by technology improvements and, in this case, enables additional module density and/or functionality.

FIG. 3, from U.S. Pat. No. 6,510,100 to Grundon et al., of common assignment herewith, depicts a simplified diagram and description of a memory system 10 that includes up to four registered DIMMs 40 on a traditional multi-drop stub bus. The subsystem includes a memory controller 20, an external clock buffer 30, registered DIMMs 40, an address bus 50, a control bus 60 and a data bus 70 with terminators 95 on the address bus 50 and the data bus 70. Although only a single memory channel is shown in FIG. 3, systems produced with these modules often included more than one discrete memory channel from the memory controller, with each of the memory channels operated singly (when a single channel was populated with modules) or in parallel (when two or more channels where populated with modules) to achieve the desired system functionality and/or performance.

FIG. 4, from U.S. Pat. No. 6,587,912 to Bonella et al., depicts a synchronous memory module 410 and system structure in which the repeater hubs 320 include local re-drive of the address, command and data to the local memory devices 301 and 302 via buses 321 and 322; generation of a local clock (as described in other figures and the patent text); and the re-driving of the appropriate memory interface signals to the next module or component in the system via bus 300.

FIG. 5 depicts a contemporary system composed of an integrated processor chip 500, which contains one or more processor elements and an integrated memory controller 510. In the configuration depicted in FIG. 5, multiple independent cascade interconnected memory busses 506 are logically aggregated together to operate in unison to support a single independent access request at a higher bandwidth with data and error detection/connection information distributed or "striped" across the parallel busses and associated devices. The memory controller 510 attaches to four narrow/high speed point-to-point memory busses 506, with each bus 506 connecting one of the several unique memory controller interface channels to a cascade interconnected memory subsystem 503 (or memory module) which includes at least a hub device 504 and one or more memory devices 509. Some systems further enable operations when a subset of the memory busses 506 are populated with memory subsystems 503. In this case, the one or more populated memory busses 508 may operate in unison to support a single access request.

FIG. 6 depicts a block diagram of a memory hub device 504 including a link interface 604 for providing the means to re-synchronize, translate and re-drive high speed memory access information to associated DRAM devices 509 and/or to re-drive the information downstream on memory bus 506 as applicable based on the memory system protocol. The information is received by the link interface 604 from an upstream memory hub device 504 or from a memory controller 510 (directly or via an upstream memory hub device 504) via the memory bus 506. The memory device data interface 615 manages the technology-specific data interface with the memory devices 509 and controls the bi-directional memory device data bus 608. The memory hub control 613 responds to access request packets by responsively driving the memory device 509 technology-specific address and control bus 614 (for memory devices in RANK0 501) or address and control bus 614' (for memory devices in RANK1 616) and directing the read data flow 607 and write data flow 610 selectors.

The link interface 604 in FIG. 6 decodes the packets and directs the address and command information directed to the local hub device 504 to the memory hub control 613. Memory write data from the link interface 604 can be temporarily stored in the write data queue 611 or directly driven to the memory devices 509 via the write data flow selector 610 and internal bus 612, and then sent via internal bus 609 and memory device data interface 615 to memory device data bus 608. Memory read data from memory device(s) 509 can be queued in the read data queue 606 or directly transferred to the link interface 604 via internal bus 605 and read data selector 607, to be transmitted on the upstream bus 506 as a read reply packet.

In high performance memory subsystem design, there is a desire to utilize the maximum available bandwidth on the memory bus to maximize overall system performance, as well as to reduce the latency of read commands whenever possible such that any given operation can be completed in a minimum amount of time. Many methods are utilized in the industry in an attempt to achieve these goals, including the use of very high performance memory devices, the use of very wide memory busses to connect the memory devices to the memory controller, the use of one or more levels of memory caches placed as close to the processor and/or memory controller as possible, the use of either bank open or bank closed page policies based on the system design and software optimization, the use of memory pre-fetch algorithms by the memory controller, etc. While all of these methods provide varying overall system performance benefits, many can prove very costly to implement in terms of overall system cost, physical system size, system power/cooling, etc.

Current main memory system solutions may utilize a "static" (e.g. unchanging) pre-fetch algorithm in the memory controller that is not changed once the system is running in a normal operating mode. In addition, the pre-fetch function is implemented in the memory controller circuitry with the memory subsystem acting as a slave device responding to explicit commands from the memory controller. A further characteristic of the current approach is that memory accesses from the memory subsystem(s) are "deterministic" in nature in that the time evolution associated with each memory operation can be predicted exactly by the memory controller, which is responsible for scheduling all memory operations such that no data corruption occurs and that all memory specifications are met during normal operation.

Drawbacks to the current static approach include the fact that the pre-fetch policy cannot be changed dynamically (e.g., when the memory system is running in a normal operating mode) for an input command stream that might better be serviced by another method. In a computer memory system, it is likely that certain types of command streams are better serviced with the use of a pre-fetch function while other streams relate to more random memory addresses and will not benefit from memory pre-fetches. In the case of random memory addresses, the use of a pre-fetch function may actually impede overall performance for the command stream due to the added memory accesses and bus traffic that can result from a pre-fetch function. It would be desirable to be able to dynamically switch between using a pre-fetch function and not using a pre-fetch function based on an analysis of an input command stream received at a memory hub device.

BRIEF SUMMARY OF THE INVENTION

Embodiments include a hub device including an input command stream interface and an adaptive pre-fetch logical unit (APLU). The input command stream interface detects commands from a memory controller directed to one or more memory devices that are connected to the hub device. The APLU independently analyzes the commands to determine access patterns to the memory devices. The APLU also dynamically selects between enabling a pre-fetch function and disabling the pre-fetch function for the memory devices based on the results of the analysis.

Embodiments also include a method for selecting a pre-fetch mode. The method includes detecting commands from a memory controller directed to one or more memory devices attached to a hub device. The commands are analyzed to determine access patterns to the memory devices. A dynamic selection is made between enabling a pre-fetch function and disabling the pre-fetch function for the memory devices based on the results of the analysis.

Embodiments also include a memory system including a memory controller, one or more memory devices and a memory hub device. The memory hub device is in communication with the memory controller and the memory devices. The memory hub device includes an input command stream interface and an APLU. The input command stream interface detects commands from the memory controller directed to the memory devices. The APLU independently analyzes the commands to determine access patterns to the memory devices. The APLU also dynamically selects between enabling a pre-fetch function and disabling the pre-fetch function for the memory devices based on the results of the analysis.

Further embodiments also include a memory subsystem including one or more memory devices and a memory hub device. The memory hub device includes an input command stream interface and an APLU. The input command stream interface detects commands from a memory controller directed to the memory devices. The APLU independently analyzes the commands to determine access patterns to the memory devices. The APLU also dynamically selects between enabling a pre-fetch function and disabling the pre-fetch function for the memory devices based on the results of the analysis.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

Exemplary embodiments may be utilized to reduce memory system latency by using a predictive technique to read data in the memory subsystem before it is needed, and activating (also referred to herein as enabling) or deactivating (also referred to herein as disabling) a pre-fetch function dynamically based on an assessment of whether pre-fetch will be advantageous for a current input command stream. Memory pre-fetch has been used in various levels of the memory hierarchy, but as associated with main memory, is usually a static function that is either always enabled or always disabled. The use of memory pre-fetch introduces more power consumption into the memory subsystem 503 and utilizes the memory bus for the transmission of pre-fetch data to the memory controller 510. Therefore, it is desirable to enable a pre-fetch function only at times when there is a high degree of confidence that the pre-fetched data will be useful, otherwise, overall system performance will suffer. The use of exemplary embodiments, where the pre-fetch function is located on a memory hub device 504, may result in an overall memory power savings by eliminating the need for pre-fetch requests to be issued by a memory controller 510. In addition, more bandwidth may be made available on the downstream memory bus 506 for other purposes. In other embodiments, the downstream memory bus pincount is reduced slightly during the design phase due to the diminished downstream bus activity.

Figure 6:
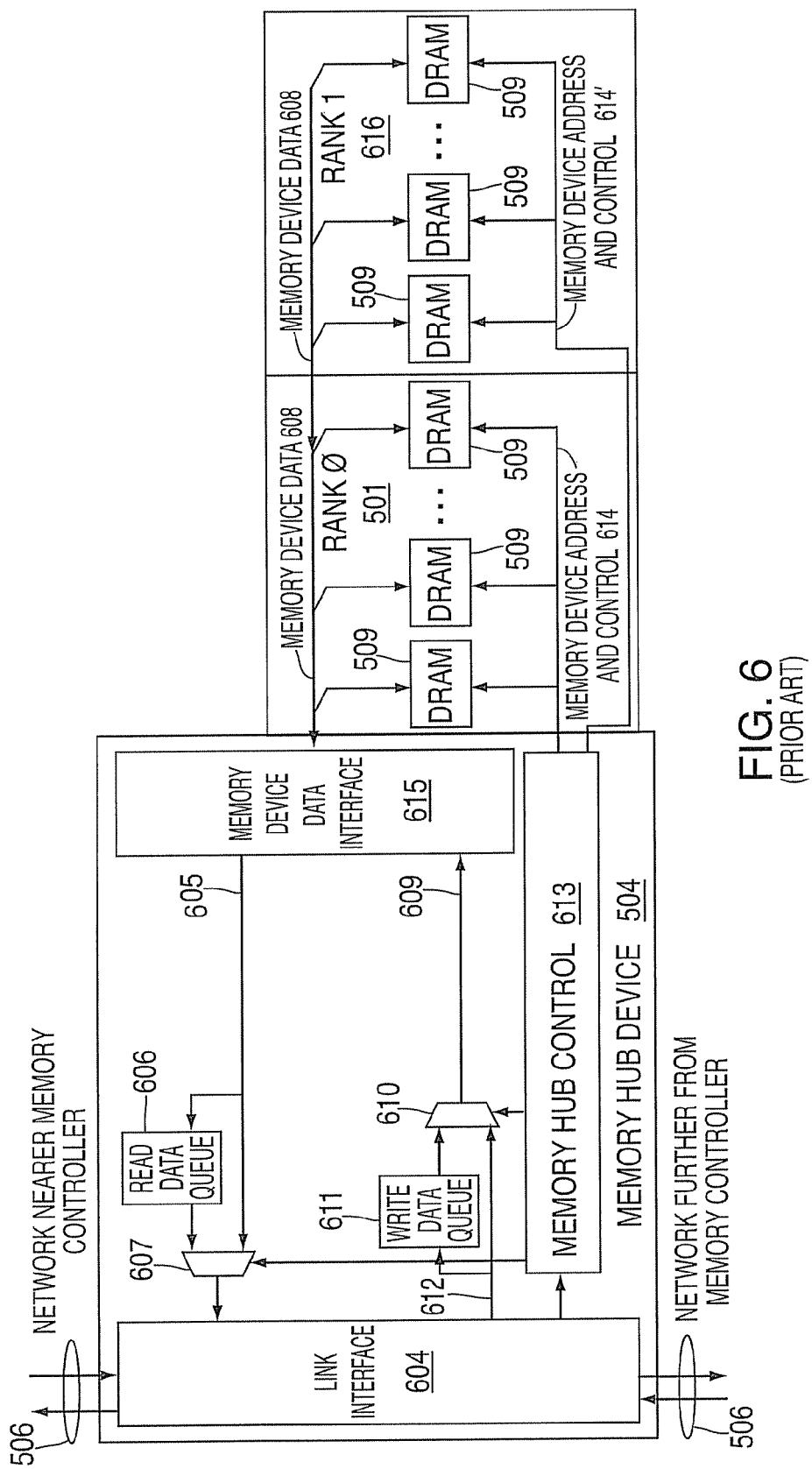
FIG. 6 is a block diagram of an exemplary hub device in a memory subsystem.
Figure 7:
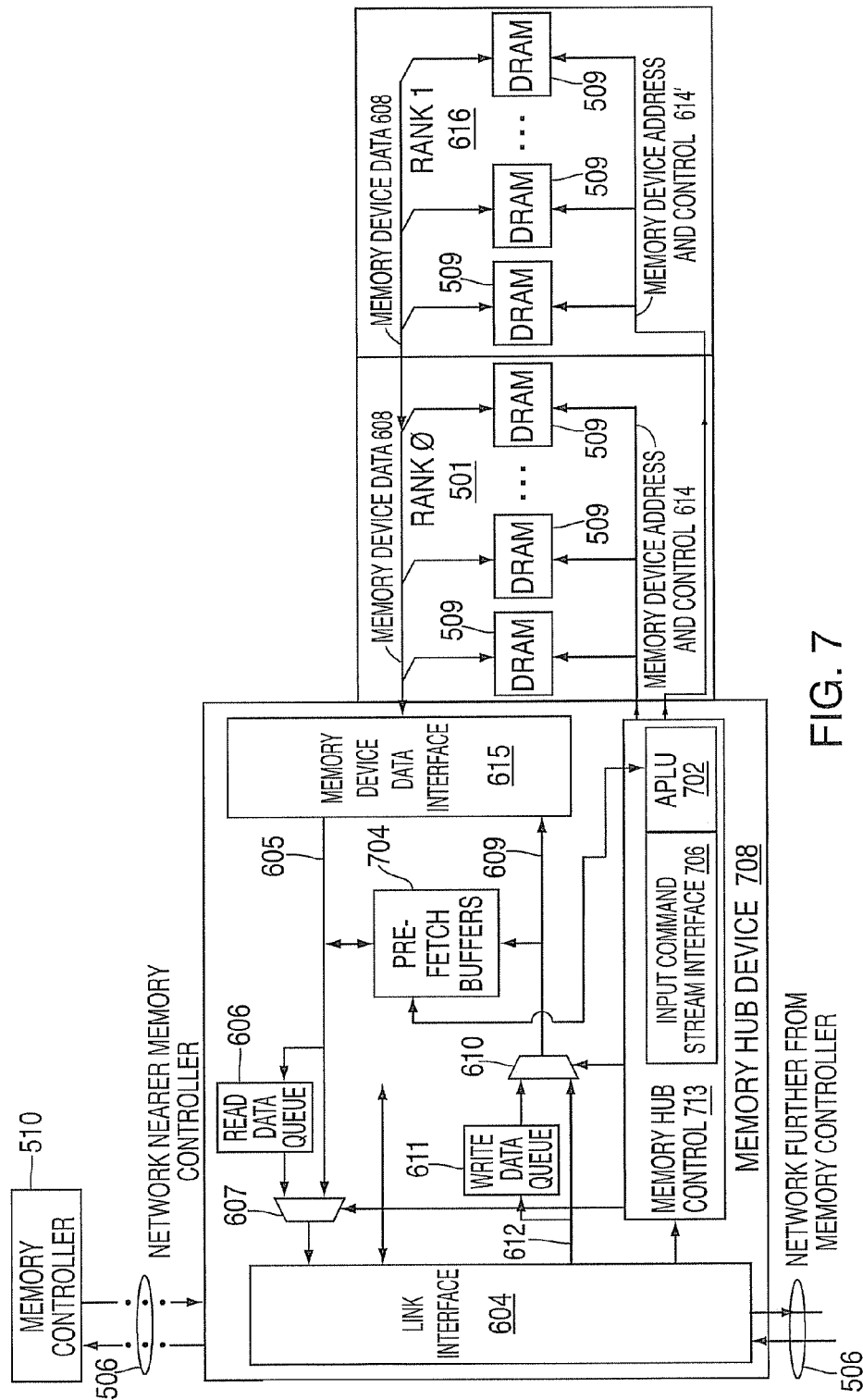
FIG. 7 is a block diagram of an exemplary hub device including an adaptive pre-fetch logical unit that may be implemented by exemplary embodiments.

FIG. 7 is a block diagram of an exemplary memory hub device 504 that may be utilized by exemplary embodiments. The hub device 708 in FIG. 7 performs the same functions described above with reference to FIG. 6 along with the added function of executing a dynamic pre-fetch function via an input command stream interface 706, an adaptive pre-fetch logical unit 702 (APLU) and one or more pre-fetch buffers 704. The hub device 708 depicted in FIG. 7 includes an input command stream interface 706 for detecting commands from a memory controller 510 that are directed to one or more memory devices 509 that are connected to the hub device 708. The hub device 708 also includes an APLU 702 for independently analyzing the commands to determine access patterns to the memory devices 509 and for dynamically selecting between enabling a pre-fetch function and disabling the pre-fetch function for the memory devices 509 based on the results of the analysis.

As used herein, the phrase APLU 702 ("adaptive pre-fetch logical unit") refers to circuitry and/or software used to control the enablement/disablement of locally (e.g., at the hub device 708) initiated pre-fetches to memory. The APLU 702 analyzes an input command stream to look for access patterns and it then enables/disables the pre-fetch function based results of the analysis. The circuitry and/or software within the APLU 702 predicts the address associated with the next command based on one or more algorithms, includes registers to record addresses of previous and current read commands and includes a pre-fetch enable counter to determine if pre-fetches to memory should be enabled for memory devices 509 (e.g., all banks on one or more memory devices 509, one or more banks on a memory device 509) being tracked (or corresponding to) the APLU 702. As used herein, the phrase "pre-fetch enable counter" refers to a counter kept by the APLU 702 to track the number of times the APLU 702 has correctly predicted the next address. In exemplary embodiments, when the APLU 702 correctly predicts the next address, the pre-fetch enable counter is incremented, and when the APLU 702 does not correctly predict the next address, the pre-fetch counter is decremented. Thus, the pre-fetch enable counter is a measure of the accuracy of the predictions. As used herein, the phrase "disable pre-fetch threshold" refers to a programmable value that when reached by the pre-fetch counter causes the pre-fetch function to be disabled. As used herein, the phrase "enable pre-fetch threshold" refers to a programmable value that when reached by the pre-fetch counter causes the pre-fetch function to be enabled.

In exemplary embodiments, the memory hub control 713 monitors an input command stream (e.g., via the input command stream interface 706) and passes decoded commands (e.g., commands received via the memory bus 506) to a command stream buffer (or register) in the APLU 702, which stores the current command information (one or more of at least a portion of the address and the command type). Logic in the APLU 702 then analyzes the command to look for access patterns in consideration of other recent command activity (e.g., previous commands stored in the command stream buffer) to determine the optimal pre-fetch mode. The APLU 702 into which the input command stream is stored and by which it is monitored can be replicated multiple times, with exemplary embodiments ranging from a single APLU 702 which operates on the entire memory to one or more units each operating on the smallest selectable portion of the memory subsystem (e.g., a memory bank). In exemplary embodiments, with multiple APLUs 702, the commands are directed to the corresponding APLU 702 based on the address associated with the command. In exemplary embodiments, the selected pre-fetch mode is communicated to the memory hub control 713 and the memory hub control 713 applies the selected pre-fetch mode when accessing the memory device(s) 509.

For ease in description, exemplary embodiments described herein are directed to an APLU 702 that is implemented for one algorithm and one bank, however it can be replicated to control all the banks of the memory subsystem 503 independently. In the example described herein, the pre-fetch function is disabled by default (i.e., the pre-fetch mode is disabled). Pre-fetch algorithms known in the art that are independent of the size of the memory controlled can be implemented to determine an optimal pre-fetch mode based on the input command stream received at the hub device 708. An example of a bank algorithm that may be utilized to determine if the pre-fetch mode should be enabled is the generation of a 'next address' based on the row stride of previous accesses. The stride is calculated by saving the previous row address, then calculating the difference between the previous row address and the current row address, and generating the next row address by adding the difference of the previous and current row addresses to the current row address. This can be represented as:

Next Row Address=Current Row Address+(Current Row Address−Previous Row Address).

Figure 8A:
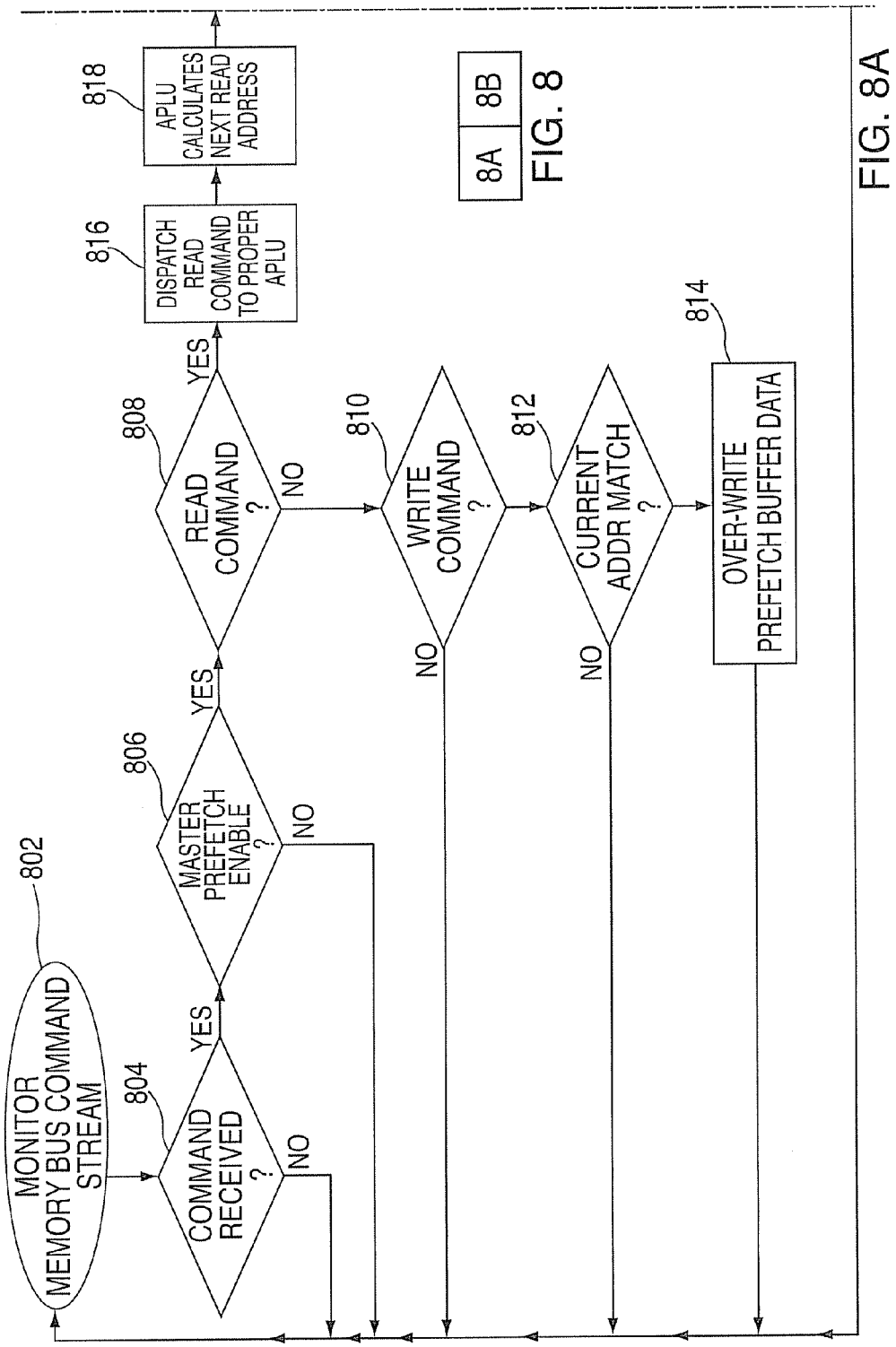
FIG. 8 includes FIG. 8A and FIG. 8B and depicts a process flow that may be implemented by exemplary embodiments.
Figure 8B:
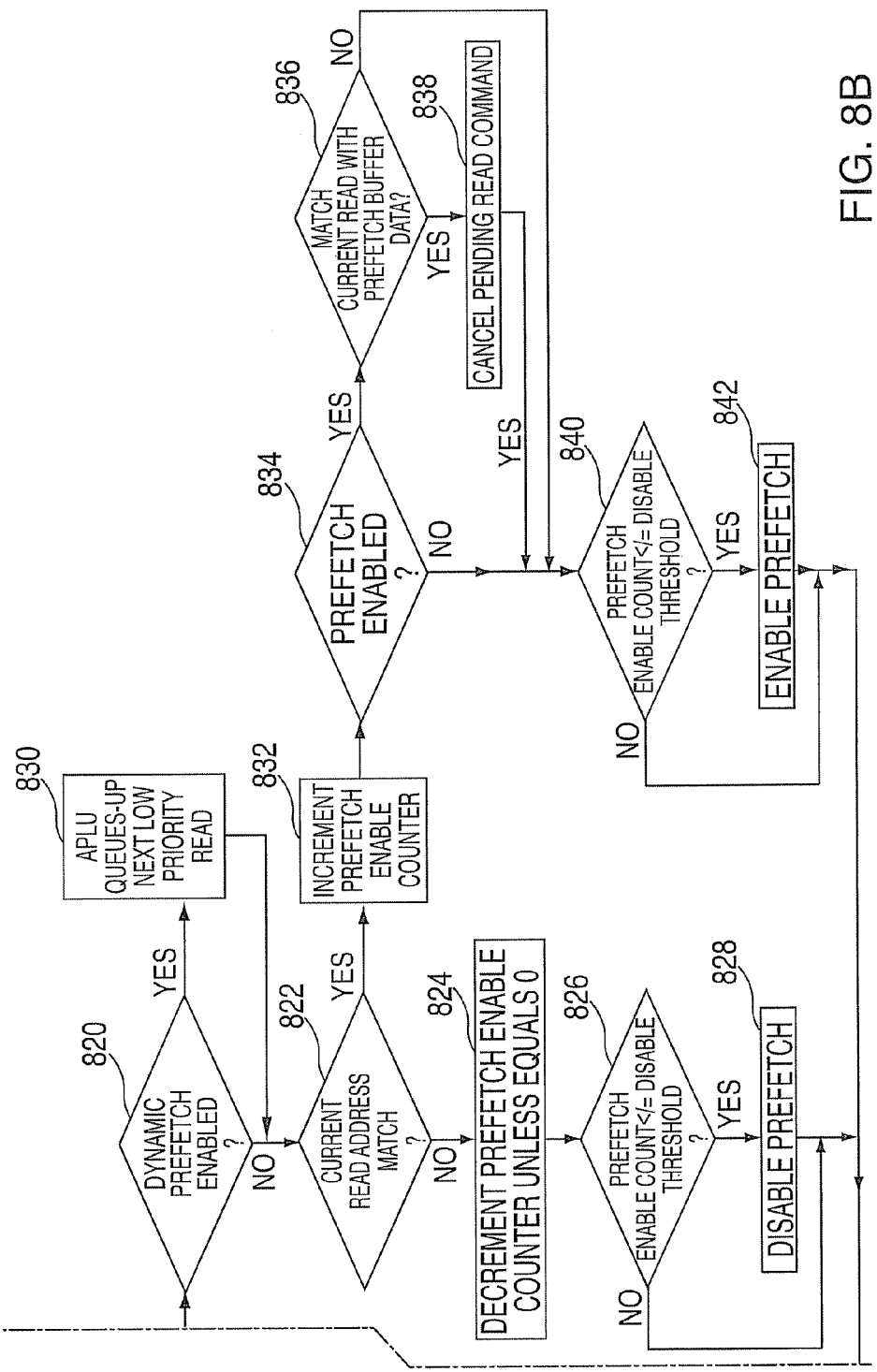

FIG. 8 depicts an exemplary use of this algorithm with respect to the APLU 702 operation. The process depicted in FIG. 8 is an exemplary embodiment of independently (e.g., at a hub device 708) analyzing commands to determine access patterns and dynamically selecting between enabling and disabling a pre-fetch function. FIG. 8 has been broken up into two sheets and includes blocks 802-818 in FIG. 8A and blocks 820-842 in FIG. 8B. FIGS. 8A and 8B are referred to herein collectively as FIG. 8. In exemplary embodiments, the pre-fetch function is local in that the decision to enable it is made at the hub device 708. FIG. 8 describes an exemplary method for selecting a pre-fetch mode that may be implemented by the APLU 702. The method includes detecting commands from a memory controller 510 (e.g., via the input command stream interface 706) directed to one or more memory devices 509 attached to the hub device 708. The commands are analyzed to determine access patterns to the memory devices 509. The APLU 702 then dynamically selects between enabling a pre-fetch function and disabling the pre-fetch function for the memory devices 509 based on results of the analysis.

At block 802 in FIG. 8, the hub device 708 monitors the memory bus command stream associated with the memory devices in that subsystem, via, for example, an input command stream interface 706. In exemplary embodiments, the input command stream interface 706 "snoops" the input command stream and transmits the decoded commands and addresses to the APLU 702. In another exemplary embodiment, the input command stream interface 706 monitors the address and command information that has been decoded by the link interface 604 as it is being transmitted to the memory hub control 713. In other exemplary embodiments, output from a module(s) located in the memory hub control 713 that is "snooping" the input command stream is utilized by the command stream interface 706. The input command stream interface 706 may be located in the memory control 713, or within the APLU 702.

When a command is received, as determined at block 804, block 806 is performed to determine if the 'master pre-fetch enable' switch for the hub device 708 has been set. If the master pre-fetch enable switch has been set, then the memory subsystem is enabled to dynamically switch between pre-fetch and non pre-fetch modes, and as such, the pre-fetch buffer(s) 704 on the hub device 708 may contain pre-fetch data previously read under the direction of the hub device 708. If the master pre-fetch enable mode has not been enabled, as determined at block 806, then no action is taken associated with the pre-fetch circuitry (e.g., the APLU 702 and pre-fetch buffers 704). In exemplary embodiments, when the master pre-fetch enable mode has not been enabled (i.e., the master pre-fetch enable switch has not been set), the pre-fetch circuitry is left in a low power state to minimize the memory subsystem power dissipation.

In exemplary embodiments, prior to enabling the 'master pre-fetch enable' switch, which can be set during system initialization or at any other point during system operation, the pre-fetch buffers 704, APLU 702 circuits and other related pre-fetch circuitry are reset such that any commands received after that time are properly executed and data integrity is maintained. If the master pre-fetch enable switch has been set, as determined at block 806, then block 808 is performed to determine if the command is a read command. If it is not a read command, then block 810 is performed to determine if the command is a write command. If the command is neither a read nor a write command, then the pre-fetch circuitry is unaffected by the command, and processing continues at block 802 where the command stream is monitored for further commands.

If the command is a write command, as determined at block 810, then the address of the write command is checked, at block 812, to determine if it matches the address of any read data in the pre-fetch buffer(s) 704. If there is a match, then block 814 is performed and the contents of the pre-fetch buffer 704, for that address, are over-written with the new data. In another exemplary embodiment, the contents of the pre-fetch buffer 704 are invalidated, generally, by setting one or more tag bits to reflect this condition, or by setting the address associated to the storage location to a reset (e.g. zero) condition.

If the command is a read command, as determined at block 808, then block 816 is performed and the read command is sent to the APLU 702 associated with the address of the read operation (in this example, the APLU circuitry is implemented on a per-bank basis). At block 818, the APLU 702 calculates the next address (also referred to herein as an expected address of future commands) based on the APLU algorithm, and that address and the current address are stored in a register for use by the APLU 702 in analyzing subsequent memory accesses to determine if an access pattern exists. If dynamic pre-fetch is enabled for this APLU 702, as determined at block 820, then block 830 is performed and a read at the next address is queued-up as a low-priority read, for possible execution. In exemplary embodiments, the pre-fetch commands are lower in priority to mainline chip commands received on the input channel memory bus 506, and there is a priority indicator in the command processed by the memory hub control block 713.

At block 822, it is determined if the current address matches the predicted address from the APLU 702. If it does not match the predicted address, then block 824 is performed and the pre-fetch enable counter for the APLU 702 is decremented unless it is at 0—at which point it stays at 0. If the pre-fetch enable counter is less than or equal to the disable pre-fetch threshold, as determined at block 826, then pre-fetching for this APLU 702 is disabled at block 828. Processing then continues at block 802 and the APLU 702 waits for the next read command addressed to it.

In exemplary embodiments, the receipt of one or more read accesses that do not follow an access pattern that is consistent with the address pattern (e.g. a stride address pattern) currently being detected and for which pre-fetches are being issued, will not preclude the APLU 702 from continuing to detect a memory access pattern at a later time, in spite of the receipt of one or more intermediate and unrelated accesses. A 'stride interrupt' counter is utilized to count the number of unrelated read operations following the enabling of dynamic pre-fetch due to the pre-fetch counter meeting or exceeding the pre-fetch threshold. If a command is received that is consistent with a previously stored "next read address," before a programmable count threshold is reached for the pre-fetch enable counter, then the pre-fetching of addresses consistent with the previously detected access pattern will continue. In exemplary embodiments, the stride interrupt counter depth is consistent with the depth of the 'current' and 'next address' register, such that a prior pre-fetch access pattern can be continued upon receipt of a command consistent with that access pattern. In yet further exemplary embodiments, a "predicted address miss limit counter" is utilized to immediately disable the dynamic pre-fetch mode and/or reset the pre-fetch counter to a value below the pre-fetch enable threshold once a pre-defined number (e.g. 2, 4, 8, etc) of unrelated accesses are received when dynamic pre-fetch is enabled.

If it is determined, at block 822, that the address from the current read command matches the predicted (calculated) read address from the previous read command, then the pre-fetch enable counter is incremented at block 832. If it is determined, at block 834, that the dynamic pre-fetch mode is enabled, then block 836 is performed to match the current read command with the corresponding data in the pre-fetch buffer 704. In other exemplary embodiments, the contents of the pre-fetch buffer 704 are checked in cases where the pre-fetch function is not currently enabled, since pre-fetches may have been completed in relation to previous accesses, and the pre-fetch buffer 704 may contain one or more pre-fetches resulting from previous commands. At block 838, the current read command is cancelled (this does not affect any pending pre-fetch using the 'next address', as calculated by the APLU 702). If the data is not present in the pre-fetch buffer 704, then the 'current' read command is issued, followed by (at a lower priority) the pre-fetch command using the 'next address' from the APLU 702. Whether or not the dynamic pre-fetch mode is enabled, block 840 is performed where the pre-fetch enable count is checked to see if it is greater than or equal to the enable threshold. If it is, then block 842 is performed and dynamic pre-fetch mode is enabled. Processing then continues at block 802 and the APLU 702 waits for the next read command addressed to it.

In exemplary embodiments, the size of the pre-fetch buffer 704 will determine the method used to invalidate earlier pre-fetch buffer entries. An exemplary embodiment having a variable buffer size invalidates the contents of the pre-fetch buffer 704 upon receipt of a command that disables the dynamic pre-fetch mode. Other exemplary embodiments include a fixed size pre-fetch buffer 704 that retains a pre-fetch count (e.g., 8), in addition to the address information and a tag indicating whether the contents of the pre-fetch buffer 704 are valid. Once the 8 buffer positions are filled, the $9^{th}$ pre-fetch would replace the oldest entry in the pre-fetch buffer 704, which may be implemented as a FIFO storage device, and this process would continue as more pre-fetches occur. In exemplary embodiments, the tag is set to 'invalid' upon receipt of a write operation to that address, if the write data is not used to overwrite the data for that address. In exemplary embodiment, the tag is invalidated during test modes, during a memory reset, upon determination of a data error (such as via a local ECC check of the data) or other modes. Further exemplary embodiments invalidate a buffer entry once the contents have been read by a current read command, thereby continuously freeing-up buffer space.

The following description is intended as an example of a sequence of read commands to strided addresses, associated with an APLU analysis algorithm for detecting and predicting strided addresses, or determining access patterns, which results in a pre-fetch buffer match after several read commands are received by the hub device 708:

$1^{st}$ command) Receive read command for address 'n' (for simplicity, this is the first read command after initialization). Dynamic pre-fetch is not enabled, the pre-fetch enable counter is at 0, and the read is executed for address 'n'. A 'next address' is calculated based on a default stride value. The current and predicted addresses are stored in registers, as described for block 818.

$2^{nd}$ command) Receive read command for address 'n+m'. APLU logic calculates a stride address of 'm', then calculates a next address of 'n+m+m' (n+2m) and stores this. Dynamic pre-fetch is not enabled, the current read does not match the 'next address' predicted by the previous read (since the algorithm had no viable means to calculate it) so the pre-fetch counter is not incremented. The read is executed for address 'n+m'.

$3^{rd}$ command) Receive read command for address 'n+2m'. APLU logic calculates a stride address of 'm' again, then calculates a next address of 'n+3m'. At this point, the enable pre-fetch counter is incremented since there is a match between the current address and the previously calculated 'next address'. If the pre-fetch enable threshold is set to 1 (a programmable value), the threshold is met and a pre-fetch for 'n+3m' will be scheduled on a low priority (e.g., after execution of the received read command, which would have priority). The current read is executed for 'n+2m' and the pre-fetch of 'n+3m' is subsequently executed.

$4^{th}$ command) Receive read command for address 'n+3m'. APLU logic calculates a stride address of 'm' again, then calculates a next address of 'n+4m'. The pre-fetch enable counter is incremented since there is a match between the current address and the previously calculated 'next address', and if the enable pre-fetch counter threshold is met, a pre-fetch is scheduled (on a low priority) for address 'n+4m'. In the meantime, the 'n+3m' contents are found in the pre-fetch buffer (since the pre-fetch initiated by the $3^{rd}$ command has been completed), so the read is cancelled for current address 'n+3m'. The pre-fetch of 'n+4m' is issued.

As long as read requests consistent with the stride distance 'n' are received, the pre-fetch of the next address will occur and the current read request may be found in the pre-fetch buffer 704 if the pre-fetch has been completed prior to the receipt of the next address. In exemplary embodiments, if a scheduled pre-fetch has been initiated but is not completed for an address that is subsequently requested by a current read command, the response to the pre-fetch command will be used by the current read command. If the pre-fetch command has not yet been issued to the memory, the pre-fetch command will be cancelled, and the current read command will be processed normally.

In other exemplary embodiments, greater efficiencies will be obtained by completing more than one pre-fetch once a strided command stream has been detected. This is especially important in cases where the next strided read command is received prior to the completion of the pre-fetch command. In this case, the APLU 702 would calculate two or more next read addresses, and schedule each of them in sequence in an attempt to maximize overall memory performance for the strided read commands. In the above example, upon receipt of the $3^{rd}$ command, since it its known that the 3rd command having a common stride length (m) has been received, the APLU 702 would issue more than one pre-fetch (e.g. issue pre-fetches for at least 'n+3m' and 'n+4m'), and may increase the pre-fetch count further, either at that time or once the stride has been confirmed one or more additional times.

The granularity of APLU pre-fetch engines can be implemented up to a per bank per algorithm basis, but can also be implemented on a per rank, or per memory device, or per hub basis. A portion of the APLU circuitry may be shared by one or more APLU engines, including one or more of the command response and decode logic (e.g., as described in FIG. 8) and the use of a shared pre-fetch buffer memory.

When pre-fetches are enabled, the pre-fetched data is stored in a pre-fetch buffer 704, which will also include at least a portion of the address that was accessed for the pre-fetched data. An address match is used as the exemplary method for determining if a current read command matches the contents in the pre-fetch buffer 704. In exemplary embodiments, to maintain pre-fetch buffer coherency, write commands to an address that are present in the pre-fetch buffer 704 will overwrite the data that is associated with that address.

Exemplary embodiments include the use of "tag" bits associated with all memory read transfers to the memory controller 510, such that memory data can be returned to the memory controller 510 either earlier or later than might otherwise be expected in a conventional memory subsystem structure. In addition, the tag bits may be used to identify memory accesses that were not requested by the memory controller 510, but were pre-fetched by the memory subsystem 503 based on a local algorithm, which may or may not be under the direct or indirect control of the memory controller 510. The tag bit includes enough information to match a memory access to a memory request by the memory controller 510. In exemplary embodiments, the tag bit includes the entire address associated with the memory access, while in alternate exemplary embodiments, a subset of the address is sufficient. An example of the use of tag bits is described in U.S. patent application Ser. No. 11/419,586 filed on May 22, 2006 of common assignment herewith, which is hereby incorporated by reference in its entirety.

FIG. 8 depicts an exemplary analysis that may be performed (e.g., at a hub device) to determine when to enable/disable a pre-fetch function. Other analysis methods may also be implemented at the hub device as long as the analysis can be performed based on information accessible to the hub device. There are many pre-fetch analysis methods known in the art and any of these may be utilized without departing from the scope of the invention described herein.

In other exemplary embodiments, the functions described herein are implemented in the memory controller 510 and the setting of the pre-fetch mode is dynamic based on algorithms used by the memory controller 510, and the memory controller 510 modifies the hub operation mode by means of either commands sent to the hub over the memory bus 506, or by means of a second (lower speed) bus such as an SMBus, and I2C bus or another bus that permits communication between the memory controller 510 and/or the integrated processor and the hub device(s) 504.

Exemplary embodiments include a computing system with a processor(s) and an I/O unit(s) (e.g., requesters) interconnected to a memory system that contains a memory controller and memory devices. In exemplary embodiments, the memory system includes a processor or memory controller interfaced to a set of hub devices (also referred to as "hub chips"). The hub devices connect and interface to the memory devices. In exemplary embodiments the computer memory system includes a physical memory array with a plurality of memory devices for storing data and instructions. These memory devices may be connected directly to the memory controller and/or indirectly coupled to the memory controller through hub devices. In exemplary embodiments, the hub-based computer memory system has memory devices attached to a communication hub device that is connected to a memory control device (e.g., a memory controller). Also in exemplary embodiments, the hub device is located on a memory module (e.g, a single substrate or physical device) that includes two or more hub devices that are cascaded interconnected to each other (and possibly to another hub device located on another memory module) via the memory bus.

Hub devices may be connected to the memory controller through a multi-drop or point-to-point bus structure (which may further include a cascade connection to one or more additional hub devices). Memory access requests are transmitted by the memory controller through the bus structure (e.g., the memory bus) to the selected hub(s). In response to receiving the memory access requests, the hub device translates the memory access requests to control the memory devices to store write data from the hub device or to provide read data to the hub device. Read data is encoded into one or more communication packet(s) and transmitted through the memory bus(ses) to the memory controller.

In alternate exemplary embodiments, the memory controller(s) may be integrated together with one or more processor chips and supporting logic, packaged in a discrete chip (commonly called a "northbridge" chip), included in a multi-chip carrier with the one or more processors and/or supporting logic, or packaged in various alternative forms that best match the application/environment. Ally of these solutions may or may not employ one or more narrow/high speed links to connect to one or more hub chips and/or memory devices.

Figure 1:
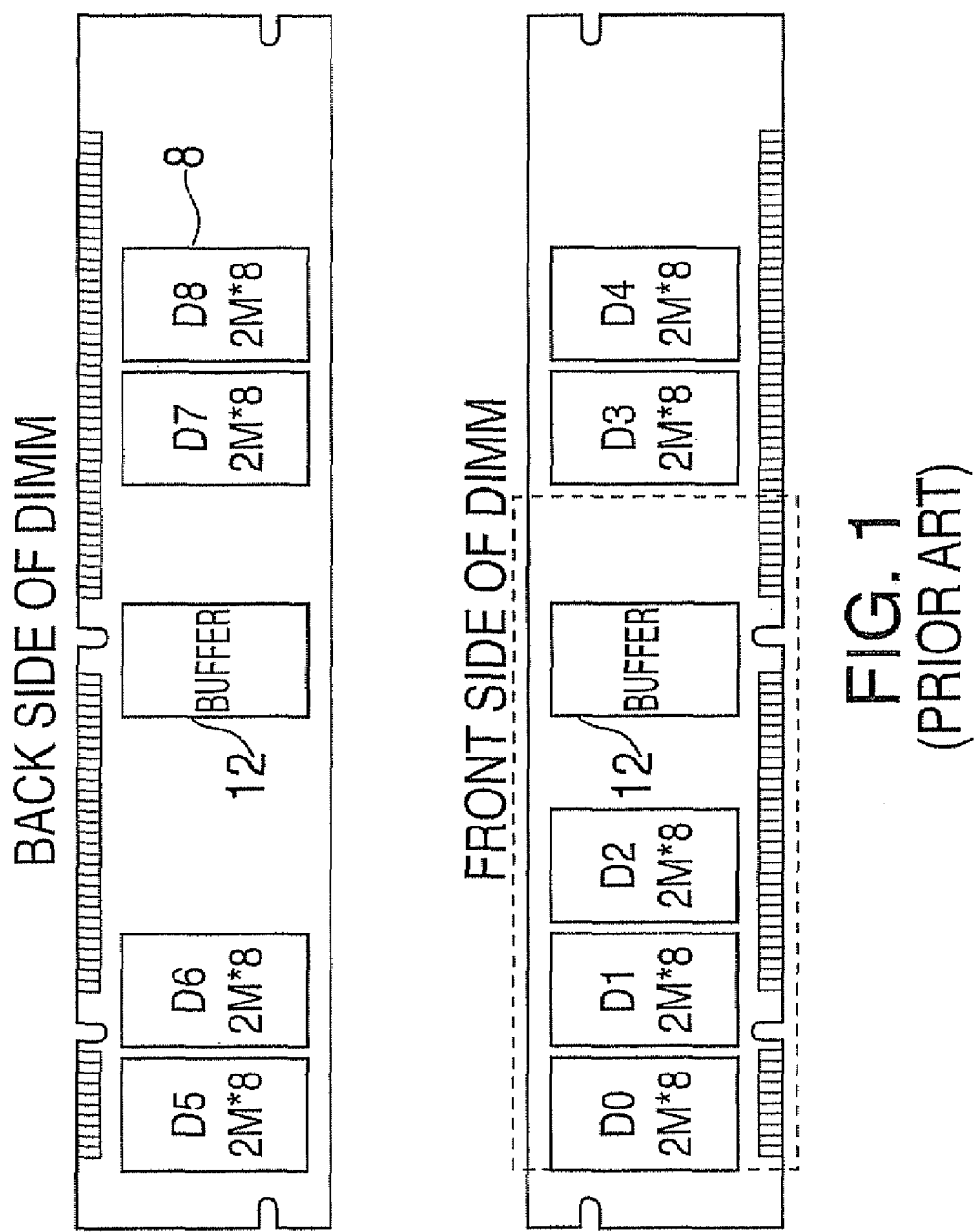
FIG. 1 depicts an exemplary early synchronous memory module.
Figure 2:
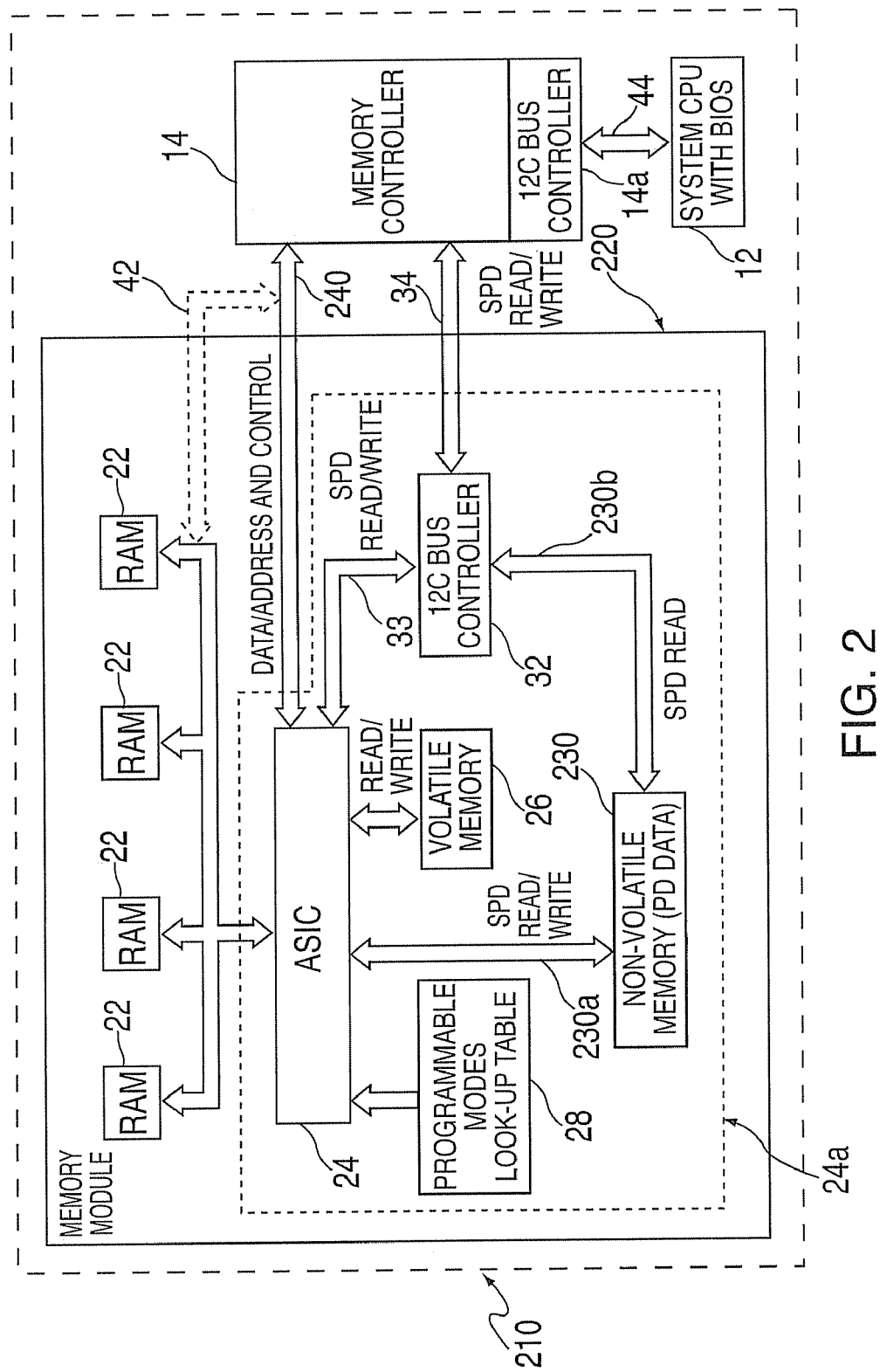
FIG. 2 depicts an exemplary computer system with a fully buffered synchronous memory module that is directly connected to a memory controller.
Figure 3:
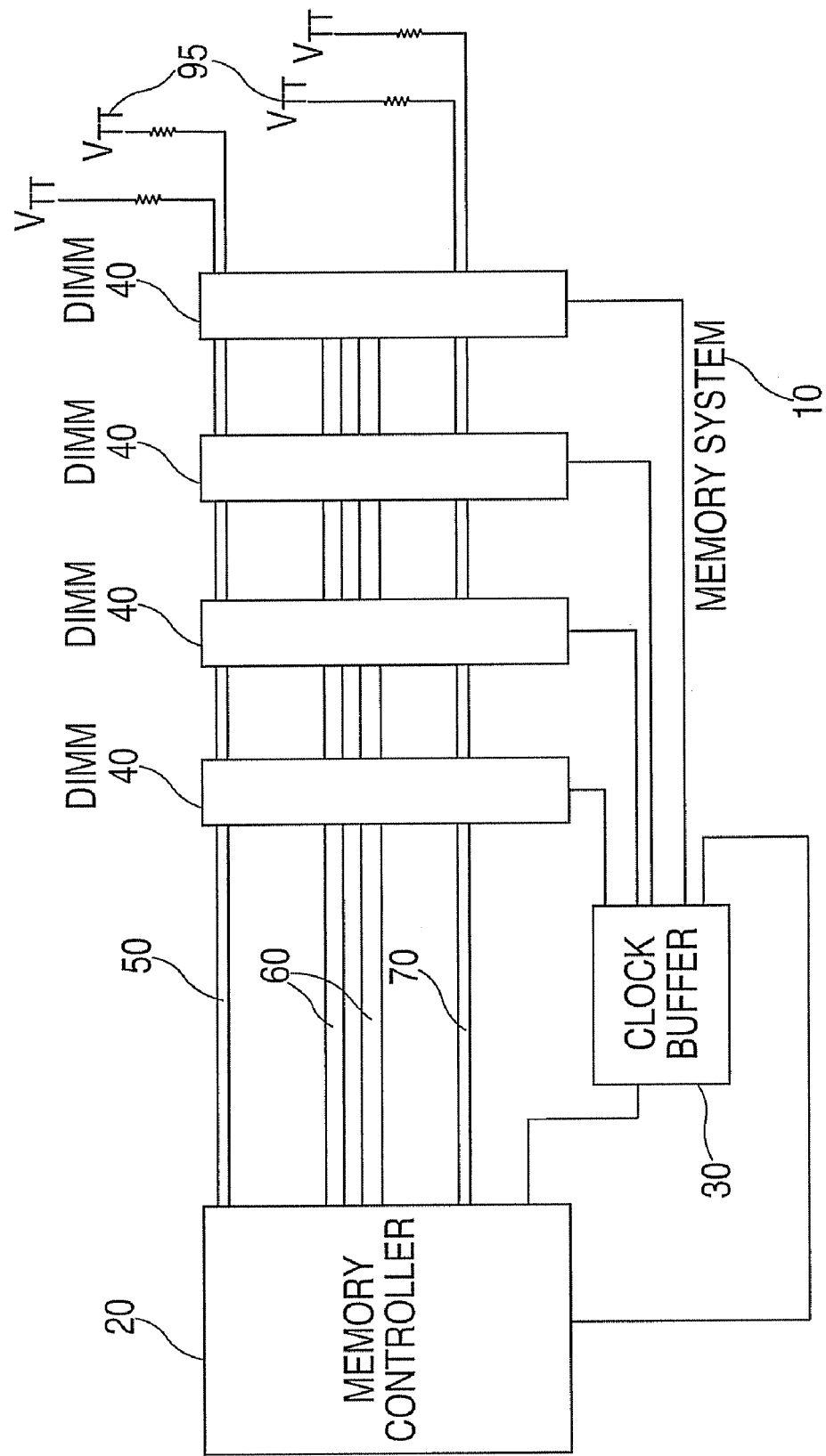
FIG. 3 depicts an exemplary memory system, shown with a single, traditional multi-drop stub bus.
Figure 4:
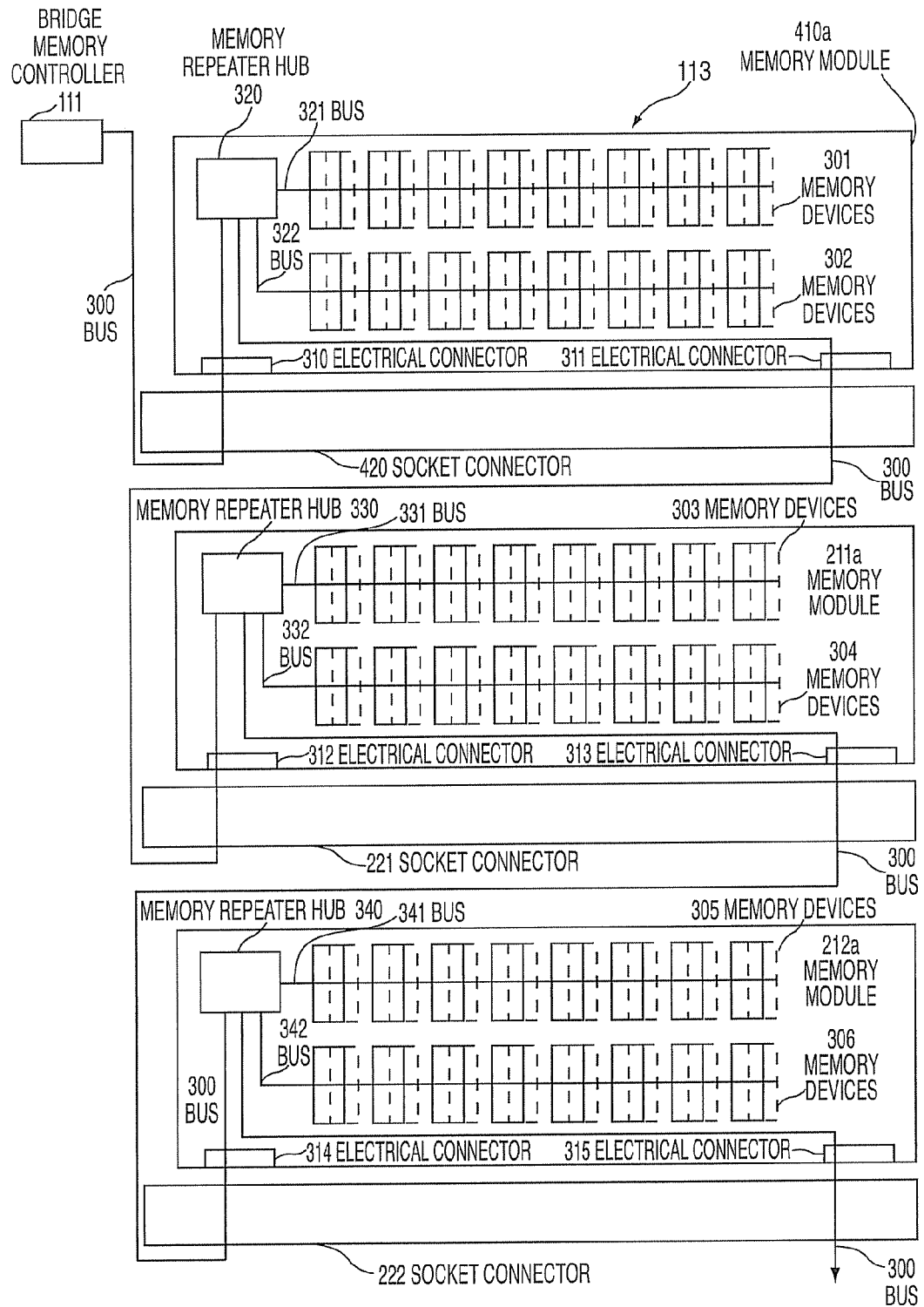
FIG. 4 depicts a fully buffered synchronous memory module and system structure, where the fully buffered synchronous memory module includes a repeater function.
Figure 5:
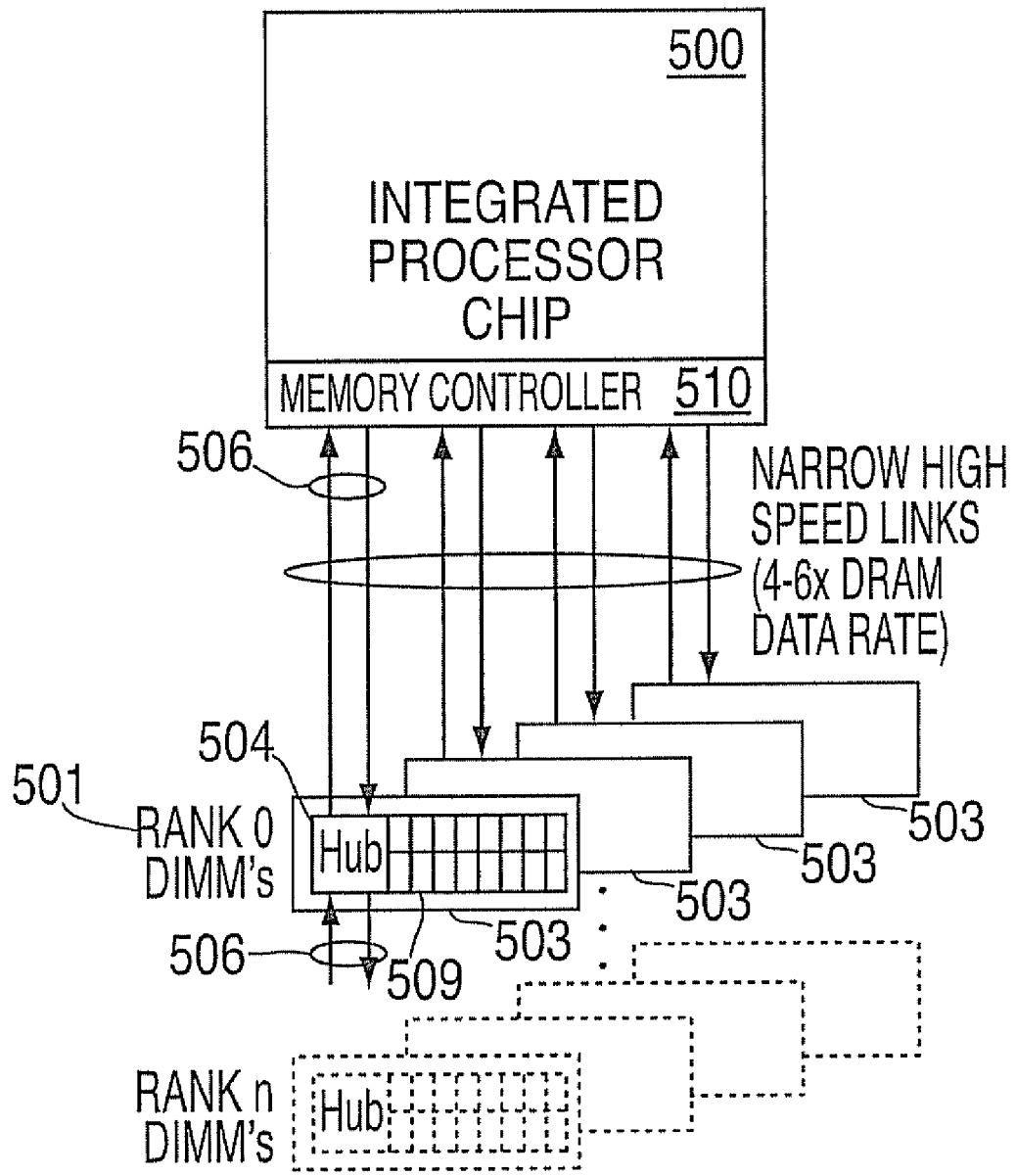
FIG. 5 depicts a block diagram of a computer memory system which includes multiple independent cascade interconnect memory interface busses that operate in unison to support a single data access request.

The memory modules may be implemented by a variety of technology including a DIMM, a single in-line memory module (SIMM) and/or other memory module or card structures. In general, a DIMM refers to a small circuit board which is comprised primarily of random access memory (RAM) integrated circuits or die on one or both sides with signal and/or power pins on both sides of the board. This can be contrasted to a SIMM which is a small circuit board or substrate composed primarily of RAM integrated circuits or die on one or both sides and single row of pins along one long edge. The DIMM depicted in FIG. 1 includes 168 pins in the exemplary embodiment, whereas subsequent DIMMs have been constructed with pincounts ranging from 100 pins to over 300 pins. In exemplary embodiments described herein, memory modules may include two or more hub devices.

In exemplary embodiments, the memory bus is constructed using multi-drop connections to hub devices on the memory modules and/or using point-to-point connections. The downstream portion of the controller interface (or memory bus), referred to as the downstream bus, may include command, address, data and other operational, initialization or status information being sent to the hub devices on the memory modules. In exemplary embodiments, the downstream memory bus connects a memory controller to a hub device, or connects a hub device to another hub device further away from the memory controller. Each hub device may simply forward the information to the subsequent hub device(s) via bypass circuitry; receive, interpret and re-drive the information if it is determined to be targeting a downstream hub device; re-drive some or all of the information without first interpreting the information to determine the intended recipient; or perform a subset or combination of these options. In exemplary embodiments, the downstream bus has a protocol that is used to control the memory system.

The upstream portion of the memory bus, referred to as the upstream bus, returns requested read data and/or error, status or other operational information, and this information may be forwarded to the subsequent hub devices via bypass circuitry; be received, interpreted and re-driven if it is determined to be targeting an upstream hub device and/or memory controller in the processor complex; be re-driven in part or in total without first interpreting the information to determine the intended recipient; or perform a subset or combination of these options. In exemplary embodiments, the upstream bus has a protocol that is used to receive responses from the memory system.

In alternate exemplary embodiments, the point-to-point bus includes a switch or bypass mechanism which results in the bus information being directed to one of two or more possible hub devices during downstream communication (communication passing from the memory controller to a hub device on a memory module), as well as directing upstream information (communication from a hub device on a memory module to the memory controller), often by way of one or more upstream hub devices. Further embodiments include the use of continuity modules, such as those recognized in the art, which, for example, can be placed between the memory controller and a first populated hub device (i.e., a hub device that is in communication with one or more memory devices), in a cascade interconnect memory system, such that any intermediate hub device positions between the memory controller and the first populated hub device include a means by which information passing between the memory controller and the first populated hub device can be received even if the one or more intermediate hub device position(s) do not include a hub device. The continuity module(s) may be installed in any module position(s), subject to any bus restrictions, including the first position (closest to the main memory controller, the last position (prior to any included termination) or any intermediate position(s). The use of continuity modules may be especially beneficial in a multi-module cascade interconnect bus structure, where an intermediate hub device on a memory module is removed and replaced by a continuity module, such that the system continues to operate after the removal of the intermediate hub device. In more common embodiments, the continuity module(s) would include either interconnect wires to transfer all required signals from the input(s) to the corresponding output(s), or be re-driven through a repeater device. The continuity module(s) might further include a non-volatile storage device (such as an EEPROM), but would not include main memory storage devices.

In exemplary embodiments, the memory system includes one or more hub devices on one or more memory modules connected to the memory controller via a cascade interconnect memory bus, however other memory structures may be implemented such as a point-to-point bus, a multi-drop memory bus or a shared bus. Depending on the signaling methods used, the target operating frequencies, space, power, cost, and other constraints, various alternate bus structures may be considered. A point-to-point bus may provide the optimal performance in systems produced with electrical interconnections, due to the reduced signal degradation that may occur as compared to bus structures having branched signal lines, switch devices, or stubs. However, when used in systems requiring communication with multiple devices or subsystems, this method will often result in significant added component cost and increased system power, and may reduce the potential memory density due to the need for intermediate buffering and/or re-drive.

Although not shown in the FIGs., the memory modules or hub devices may also include a separate bus, such as a 'presence detect' bus, an I2C bus and/or an SMBus which is used for one or more purposes including the determination of the hub device an/or memory module attributes (generally after power-up), the reporting of fault or status information to the system, the configuration of the hub device(s) and/or memory subsystem(s) after power-up or during normal operation or other purposes. Depending on the bus characteristics, this bus might also provide a means by which the valid completion of operations could be reported by the hub devices and/or memory module(s) to the memory controller(s), or the identification of failures occurring during the execution of the main memory controller requests.

Performances similar to those obtained from point-to-point bus structures can be obtained by adding switch devices. These and other solutions offer increased memory packaging density at lower power, while retaining many of the characteristics of a point-to-point bus. Multi-drop busses provide an alternate solution, albeit often limited to a lower operating frequency, but at a cost/performance point that may be advantageous for many applications. Optical bus solutions permit significantly increased frequency and bandwidth potential, either in point-to-point or multi-drop applications, but may incur cost and space impacts.

As used herein the term "buffer" or "buffer device" refers to a temporary storage unit (as in a computer), especially one that accepts information at one rate and delivers it at another. In exemplary embodiments, a buffer is an electronic device that provides compatibility between two signals (e.g., changing voltage levels or current capability). The term "hub" is sometimes used interchangeably with the term "buffer." A hub is a device containing multiple ports that is connected to several other devices. A port is a portion of an interface that serves a congruent I/O functionality (e.g., a port may be utilized for sending and receiving data, address, and control information over one of the point-to-point links, or busses). A hub may be a central device that connects several systems, subsystems, or networks together. A passive hub may simply forward messages, while an active hub, or repeater, amplifies and refreshes the stream of data which otherwise would deteriorate over a distance. The term hub device, as used herein, refers to a hub chip that includes logic (hardware and/or software) for performing memory functions.

Also as used herein, the term "bus" refers to one of the sets of conductors (e.g., wires, and printed circuit board traces or connections in an integrated circuit) connecting two or more functional units in a computer. The data bus, address bus and control signals, despite their names, constitute a single bus since each are often useless without the others. A bus may include a plurality of signal lines, each signal line having two or more connection points, that form a main transmission path that electrically connects two or more transceivers, transmitters and/or receivers. The term "bus" is contrasted with the term "channel" which is often used to describe the function of a "port" as related to a memory controller in a memory system, and which may include one or more busses or sets of busses. The term "channel" as used herein refers to a port on a memory controller. Note that this term is often used in conjunction with I/O or other peripheral equipment, however the term channel has been adopted by some to describe the interface between a processor or memory controller and one of one or more memory subsystem(s).

Further, as used herein, the term "daisy chain" refers to a bus wiring structure in which, for example, device A is wired to device B, device B is wired to device C, etc. The last device is typically wired to a resistor or terminator. All devices may receive identical signals or, in contrast to a simple bus, each device may modify one or more signals before passing them on. A "cascade" or cascade interconnect' as used herein refers to a succession of stages or units or a collection of interconnected networking devices, typically hubs, in which the hubs operate as a logical repeater, further permitting merging data to be concentrated into the existing data stream. Also as used herein, the term "point-to-point" bus and/or link refers to one or a plurality of signal lines that may each include one or more terminators. In a point-to-point bus and/or link, each signal line has two transceiver connection points, with each transceiver connection point coupled to transmitter circuitry, receiver circuitry or transceiver circuitry. A signal line refers to one or more electrical conductors or optical carriers, generally configured as a single carrier or as two or more carriers, in a twisted, parallel, or concentric arrangement, used to transport at least one logical signal.

Memory devices are generally defined as integrated circuits that are composed primarily of memory (storage) cells, such as DRAMs (Dynamic Random Access Memories), SRAMs (Static Random Access Memories), FeRAMs (Ferro-Electric RAMs), MRAMs (Magnetic Random Access Memories), Flash Memory and other forms of random access and related memories that store information in the form of electrical, optical, magnetic, biological or other means. Dynamic memory device types may include asynchronous memory devices such as FPM DRAMs (Fast Page Mode Dynamic Random Access Memories), EDO (Extended Data Out) DRAMs, BEDO (Burst EDO) DRAMs, SDR (Single Data Rate) Synchronous DRAMs, DDR (Double Data Rate) Synchronous DRAMs or any of the expected follow-on devices such as DDR2, DDR3, DDR4 and related technologies such as Graphics RAMs, Video RAMs, LP RAM (Low Power DRAMs) which are often based on the fundamental functions, features and/or interfaces found on related DRAMs.

Memory devices may be utilized in the form of chips (die) and/or single or multi-chip packages of various types and configurations. In multi-chip packages, the memory devices may be packaged with other device types such as other memory devices, logic chips, analog devices and programmable devices, and may also include passive devices such as resistors, capacitors and inductors. These packages may include an integrated heat sink or other cooling enhancements, which may be further attached to the immediate carrier or another nearby carrier or heat removal system.

Module support devices (such as buffers, hubs, hub logic chips, registers, PLL's, DLL's, non-volatile memory, etc) may be comprised of multiple separate chips and/or components, may be combined as multiple separate chips onto one or more substrates, may be combined onto a single package or even integrated onto a single device—based on technology, power, space, cost and other tradeoffs. In addition, one or more of the various passive devices such as resistors, capacitors may be integrated into the support chip packages, or into the substrate, board or raw card itself, based on technology, power, space, cost and other tradeoffs. These packages may include an integrated heat sink or other cooling enhancements, which may be further attached to the immediate carrier or another nearby carrier or heat removal system.

Memory devices, hubs, buffers, registers, clock devices, passives and other memory support devices and/or components may be attached to the memory subsystem and/or hub device via various methods including solder interconnects, conductive adhesives, socket structures, pressure contacts and other methods which enable communication between the two or more devices via electrical, optical or alternate means.

The one or more memory modules (or memory subsystems) and/or hub devices may be connected to the memory system, processor complex, computer system or other system environment via one or more methods such as soldered interconnects, connectors, pressure contacts, conductive adhesives, optical interconnects and other communication and power delivery methods. Connector systems may include mating connectors (male/female), conductive contacts and/or pins on one carrier mating with a male or female connector, optical connections, pressure contacts (often in conjunction with a retaining mechanism) and/or one or more of various other communication and power delivery methods. The interconnection(s) may be disposed along one or more edges of the memory assembly and/or placed a distance from an edge of the memory subsystem depending on such application requirements as ease-of-upgrade/repair, available space/volume, heat transfer, component size and shape and other related physical, electrical, optical, visual/physical access, etc.

As used herein, the term memory subsystem refers to, but is not limited to: one or more memory devices; one or more memory devices and associated interface and/or timing/control circuitry; and/or one or more memory devices in conjunction with a memory buffer, hub device, and/or switch. The term memory subsystem may also refer to one or more memory devices, in addition to any associated interface and/or timing/control circuitry and/or a memory buffer, hub device or switch, assembled into a substrate, a card, a module or related assembly, which may also include a connector or similar means of electrically attaching the memory subsystem with other circuitry. The memory modules described herein may also be referred to as memory subsystems because they include one or more memory devices and hub devices.

Additional functions that may reside local to the memory subsystem and/or hub device include write and/or read buffers, one or more levels of memory cache, data encryption/decryption, compression/decompression, protocol translation, command prioritization logic, voltage and/or level translation, error detection and/or correction circuitry, data scrubbing, local power management circuitry and/or reporting, operational and/or status registers, initialization circuitry, performance monitoring and/or control, one or more co-processors, search engine(s) and other functions that may have previously resided in other memory subsystems. By placing a function local to the memory subsystem, added performance may be obtained as related to the specific function, often while making use of unused circuits within the subsystem.

Memory subsystem support device(s) may be directly attached to the same substrate or assembly onto which the memory device(s) are attached, or may be mounted to a separate interposer or substrate also produced using one or more of various plastic, silicon, ceramic or other materials which include electrical, optical or other communication paths to functionally interconnect the support device(s) to the memory device(s) and/or to other elements of the memory or computer system.

Information transfers (e.g. packets) along a bus, channel, link or other naming convention applied to an interconnection method may be completed using one or more of many signaling options. These signaling options may include such methods as single-ended, differential, optical or other approaches, with electrical signaling further including such methods as voltage or current signaling using either single or multi-level approaches. Signals may also be modulated using such methods as time or frequency, non-return to zero, phase shift keying, amplitude modulation and others. Voltage levels are expected to continue to decrease, with 1.5V, 1.2V, 1V and lower signal voltages expected consistent with (but often independent of) the reduced power supply voltages required for the operation of the associated integrated circuits themselves.

One or more clocking methods may be utilized within the memory subsystem and the memory system itself, including global clocking, source-synchronous clocking, encoded clocking or combinations of these and other methods. The clock signaling may be identical to that of the signal lines themselves, or may utilize one of the listed or alternate methods that is more conducive to the planned clock frequency (ies), and the number of clocks planned within the various subsystems. A single clock may be associated with all communication to and from the memory, as well as all clocked functions within the memory subsystem, or multiple clocks may be sourced using one or more methods such as those described earlier. When multiple clocks are used, the functions within the memory subsystem may be associated with a clock that is uniquely sourced to the subsystem, or may be based on a clock that is derived from the clock related to the information being transferred to and from the memory subsystem (such as that associated with an encoded clock). Alternately, a unique clock may be used for the information transferred to the memory subsystem, and a separate clock for information sourced from one (or more) of the memory subsystems. The clocks themselves may operate at the same or frequency multiple of the communication or functional frequency, and may be edge-aligned, center-aligned or placed in an alternate timing position relative to the data, command or address information.

Information passing to the memory subsystem(s) will generally be composed of address, command and data, as well as other signals generally associated with requesting or reporting status or error conditions, resetting the memory, completing memory or logic initialization and other functional, configuration or related information. Information passing from the memory subsystem(s) may include any or all of the information passing to the memory subsystem(s), however generally will not include address and command information. This information may be communicated using communication methods that may be consistent with normal memory device interface specifications (generally parallel in nature), the information may be encoded into a 'packet' structure, which may be consistent with future memory interfaces or simply developed to increase communication bandwidth and/or enable the subsystem to operate independently of the memory technology by converting the received information into the format required by the receiving device(s).

Initialization of the memory subsystem may be completed via one or more methods, based on the available interface busses, the desired initialization speed, available space, cost/complexity objectives, subsystem interconnect structures, the use of alternate processors (such as a service processor) which may be used for this and other purposes, etc. In one embodiment, the high speed bus may be used to complete the initialization of the memory subsystem(s), generally by first completing a training process to establish reliable communication, then by interrogation of the attribute or 'presence detect' data associated the various components and/or characteristics associated with that subsystem, and ultimately by programming the appropriate devices with information associated with the intended operation within that system. In a cascaded system, communication with the first memory subsystem would generally be established, followed by subsequent (downstream) subsystems in the sequence consistent with their position along the cascade interconnect bus.

A second initialization method would include one in which the high speed bus is operated at one frequency during the initialization process, then at a second (and generally higher) frequency during the normal operation. In this embodiment, it may be possible to initiate communication with all of the memory subsystems on the cascade interconnect bus prior to completing the interrogation and/or programming of each subsystem, due to the increased timing margins associated with the lower frequency operation.

A third initialization method might include operation of the cascade interconnect bus at the normal operational frequency (ies), while increasing the number of cycles associated with each address, command and/or data transfer. In one embodiment, a packet containing all or a portion of the address, command and/or data information might be transferred in one clock cycle during normal operation, but the same amount and/or type of information might be transferred over two, three or more cycles during initialization. This initialization process would therefore be using a form of 'slow' commands, rather than 'normal' commands, and this mode might be automatically entered at some point after power-up and/or re-start by each of the subsystems and the memory controller by way of POR (power-on-reset) logic included in each of these subsystems.

A fourth initialization method might utilize a distinct bus, such as a presence detect bus (such as the one defined in U.S. Pat. No. 5,513,135 to Dell et al., of common assignment herewith), an I2C bus (such as defined in published JEDEC standards such as the 168 Pin DIMM family in publication 21-C revision 7R8) and/or the SMBUS, which has been widely utilized and documented in computer systems using such memory modules. This bus might be connected to one or more modules within a memory system in a daisy chain/cascade interconnect, multi-drop or alternate structure, providing an independent means of interrogating memory subsystems, programming each of the one or more memory subsystems to operate within the overall system environment, and adjusting the operational characteristics at other times during the normal system operation based on performance, thermal, configuration or other changes desired or detected in the system environment.

Other methods for initialization can also be used, in conjunction with or independent of those listed. The use of a separate bus, such as described in the fourth embodiment above, also offers the advantage of providing an independent means for both initialization and uses other than initialization, such as described in U.S. Pat. No. 6,381,685 to Dell et al., of common assignment herewith, including changes to the subsystem operational characteristics on-the-fly and for the reporting of and response to operational subsystem information such as utilization, temperature data, failure information or other purposes.

With improvements in lithography, better process controls, the use of materials with lower resistance, increased field sizes and other semiconductor processing improvements, increased device circuit density (often in conjunction with increased die sizes) will help facilitate increased function on integrated devices as well as the integration of functions previously implemented on separate devices. This integration will serve to improve overall performance of the intended function, as well as promote increased storage density, reduced power, reduced space requirements, lower cost and other manufacturer and customer benefits. This integration is a natural evolutionary process, and may result in the need for structural changes to the fundamental building blocks associated with systems.

The integrity of the communication path, the data storage contents and all functional operations associated with each element of a memory system or subsystem can be assured, to a high degree, with the use of one or more fault detection and/or correction methods. Any or all of the various elements may include error detection and/or correction methods such as CRC (Cyclic Redundancy Code), EDC (Error Detection and Correction), parity or other encoding/decoding methods suited for this purpose. Further reliability enhancements may include operation re-try (to overcome intermittent faults such as those associated with the transfer of information), the use of one or more alternate or replacement communication paths to replace failing paths and/or lines, complement-re-complement techniques or alternate methods used in computer, communication and related systems.

The use of bus termination, on busses as simple as point-to-point links or as complex as multi-drop structures, is becoming more common consistent with increased performance demands. A wide variety of termination methods can be identified and/or considered, and include the use of such devices as resistors, capacitors, inductors or any combination thereof, with these devices connected between the signal line and a power supply voltage or ground, a termination voltage or another signal. The termination device(s) may be part of a passive or active termination structure, and may reside in one or more positions along one or more of the signal lines, and/or as part of the transmitter and/or receiving device(s). The terminator may be selected to match the impedance of the transmission line, or selected via an alternate approach to maximize the useable frequency, operating margins and related attributes within the cost, space, power and other constraints.

Emerging high performance systems are adapting new bus structures to address some of the system cost and memory density concerns, including the use of cascade-interconnected memory subsystems that include one or more hub device(s) on a memory module. With the inclusion of the hub device(s), which can act upon command, data and address information intended for the memory devices, new solutions to maximize overall system performance can be considered. Technical effects of exemplary embodiments include reducing overall memory system latency, thereby improving system performance. In exemplary embodiments, the specific areas of improvement relate to an overall memory system power savings due to the elimination of pre-fetch requests being issued by the memory controller. In addition, more bandwidth may be available on the downstream memory bus for other purposes and/or the downstream memory bus pin-count could be reduced due to the diminished bus activity.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A hub device comprising:
an input command stream interface detecting commands from a memory controller directed to one or more memory devices that are connected to the hub device; and
an adaptive pre-fetch logical unit (APLU) independently analyzing the commands to determine access patterns to the memory devices and dynamically selecting between enabling a pre-fetch function and disabling the pre-fetch function for the memory devices based on results of the analysis, wherein the pre-fetch function dispatches pre-fetch read commands at a lower priority than read commands from the memory controller.

2. The hub device of claim 1 wherein the access patterns are read access patterns.

3. The hub device of claim 1 wherein the analyzing includes predicting expected addresses of future commands from the memory controller based on the access patterns, wherein the pre-fetch function is enabled when the accuracy of the predicting is equal to or above an enable pre-fetch threshold and the pre-fetch function is disabled when the accuracy of the predicting is equal to or below a disable pre-fetch threshold.

4. The hub device of claim 1 further comprising a pre-fetch buffer utilized by the pre-fetch function for storing pre-fetched data and addresses.

5. The hub device of claim 4 wherein data coherency is maintained in the pre-fetch buffer during write operations.

6. The hub device of claim 1 wherein the analyzing and selecting applied to one bank of the one or more memory devices is independent of the analyzing and selecting applied to an other bank of the one or more memory devices.

7. The hub device of claim 1 wherein the analyzing and selecting applies to all of the memory devices.

8. The hub device of claim 1 wherein the commands include pending commands located in a memory command buffer.

9. The hub device of claim 8 wherein the APLU further reorders the pending commands in the memory command buffer to alter future access patterns.

10. A hub device comprising:
an input command stream interface receiving a first command stream from a memory controller and detecting commands directed to one or more memory devices that are connected to the hub device; and
an adaptive pre-fetch logical unit (APLU) independently analyzing the commands to determine access patterns to the memory devices and dynamically selecting between enabling a pre-fetch function and disabling the pre-fetch function for the memory devices based on results of the analysis, wherein the pre-fetch function generates a second command stream including pre-fetch read commands that are processed by the hub device and the hub device assigns priorities to the commands from the first and second command streams.

11. The hub device of claim 10 wherein a command from the memory controller has an expected data return time and the expected data return time is delayed in response to an in-process pre-fetch command executing on the hub device.

12. The hub device of claim 10 wherein the pre-fetch read commands have a lower priority than the read commands from the memory controller.

13. The hub device of claim 10 wherein the access patterns are read access patterns.

14. The hub device of claim 10 wherein the analyzing includes predicting expected addresses of future commands from the memory controller based on the access patterns, wherein the pre-fetch function is enabled when the accuracy of the predicting is equal to or above an enable pre-fetch threshold and the pre-fetch function is disabled when the accuracy of the predicting is equal to or below a disable pre-fetch threshold.

15. The hub device of claim 10 wherein the analyzing and selecting applied to one bank of the one or more memory devices is independent of the analyzing and selecting applied to an other bank of the one or more memory devices.

16. A hub device comprising:
an input command stream interface detecting commands from a memory controller directed to one or more memory devices that are connected to the hub device;
an adaptive pre-fetch logical unit (APLU) independently analyzing the commands to determine access patterns to the memory devices and for dynamically selecting between enabling a pre-fetch function and disabling the pre-fetch function for the memory devices based on results of the analysis; and a master pre-fetch enable switch set in response to a source external to the hub device to indicate if the ALPLU is enabled or disabled, wherein the APLU does not perform the independent analyzing or dynamic selecting when it is disabled.

17. The hub device of claim 16 wherein circuits utilized exclusively by the APLU are in a low power state when the APLU is disabled.

18. The hub device of claim 16 wherein the analyzing includes predicting expected addresses of future commands from the memory controller based on the access patterns, wherein the pre-fetch function is enabled when the accuracy of the predicting is equal to or above an enable pre-fetch threshold and the pre-fetch function is disabled when the accuracy of the predicting is equal to or below a disable pre-fetch threshold.

19. The hub device of claim 16 further comprising a pre-fetch buffer utilized by the pre-fetch function for storing pre-fetched data and addresses, wherein data coherency is maintained in the pre-fetch buffer during write operations.

20. The hub device of claim 16 wherein the analyzing and selecting applied to one bank of the one or more memory devices is independent of the analyzing and selecting applied to an other bank of the one or more memory devices.

* * * * *